(12) United States Patent
Barron et al.

(10) Patent No.: US 9,268,887 B2
(45) Date of Patent: Feb. 23, 2016

(54) SYSTEM AND METHOD FOR DETERMINING FLUID FLOW OF COMPRESSIBLE AND NON-COMPRESSIBLE LIQUIDS

(75) Inventors: Ronald Barron, St. Clair Beach (CA); Ali Salih, Windsor (CA); James Jianmin Situ, Windsor (CA)

(73) Assignee: UNIVERSITY OF WINDSOR, Windsor (CA)

( * ) Notice: Subject to any disclaimer, the term of this patent is extended or adjusted under 35 U.S.C. 154(b) by 606 days.

(21) Appl. No.: 13/455,586

(22) Filed: Apr. 25, 2012

(65) Prior Publication Data

US 2012/0278052 A1 Nov. 1, 2012

Related U.S. Application Data

(60) Provisional application No. 61/457,589, filed on Apr. 26, 2011.

(51) Int. Cl.
  *G06F 7/60* (2006.01)
  *G06F 17/10* (2006.01)
  *G06F 17/50* (2006.01)
  *G06F 17/17* (2006.01)

(52) U.S. Cl.
  CPC ............ *G06F 17/5018* (2013.01); *G06F 17/17* (2013.01); *G06F 2217/16* (2013.01)

(58) Field of Classification Search
  CPC .. G06F 17/5018; G06F 2217/16; G06F 17/13
  USPC ............................................................ 703/2
  See application file for complete search history.

(56) References Cited

U.S. PATENT DOCUMENTS

| | | | |
|---|---|---|---|
| 2004/0167757 A1* | 8/2004 | Struijs | 703/2 |
| 2009/0234624 A1* | 9/2009 | Yu | 703/9 |
| 2009/0281776 A1* | 11/2009 | Cheng et al. | 703/2 |

* cited by examiner

*Primary Examiner* — Aniss Chad

(57) ABSTRACT

A system and method for determining fluid flow of compressible and non-compressible liquids includes an input receiving an object model defined as a plurality of cells having nodes, a processor and memory. The processor is configured for: discretizing a partial differential equation (PDE) corresponding to the received model; for each node P: (i) locating all neighboring cells that share the node P; establish a finite difference stencil at each cell center, and identify stencil intersection points with cell boundary edges; calculate an approximate solution of the PDE at the intersection points; (ii) approximating the PDE at the cell center of the neighboring cells using the stencil and discretized PDE; and (iii) updating a solution of the PDE at the node P by using the solution of approximated discretized PDE at all the neighboring cell centers; and iteratively updating the solution for all nodes P from an initial guess until a convergence criterion is satisfied.

17 Claims, 22 Drawing Sheets

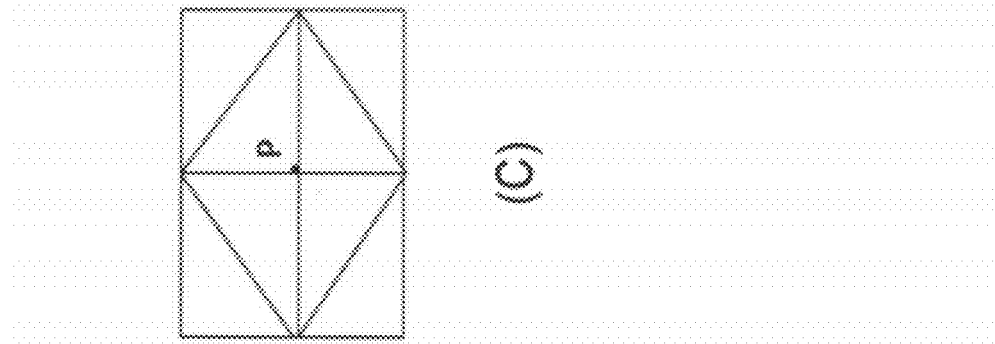
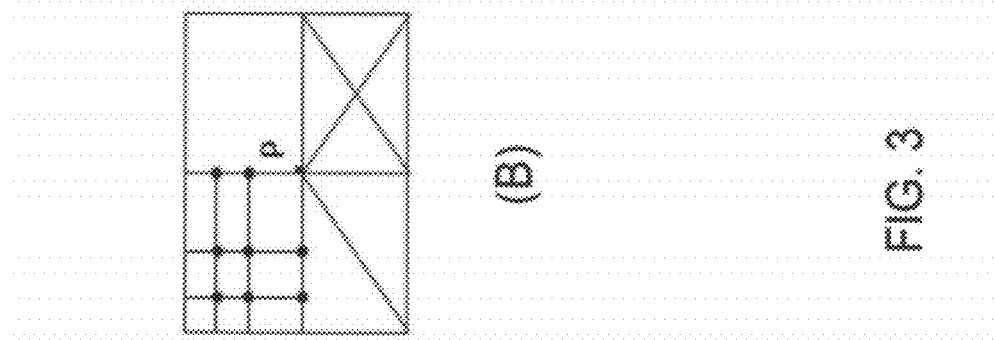
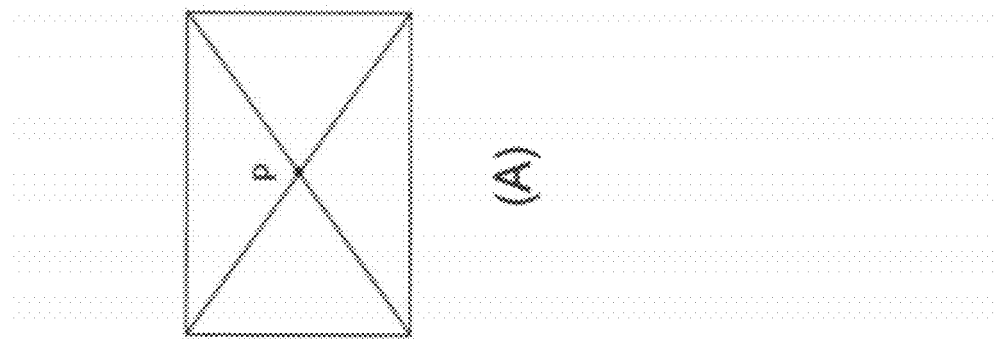
FIG. 3

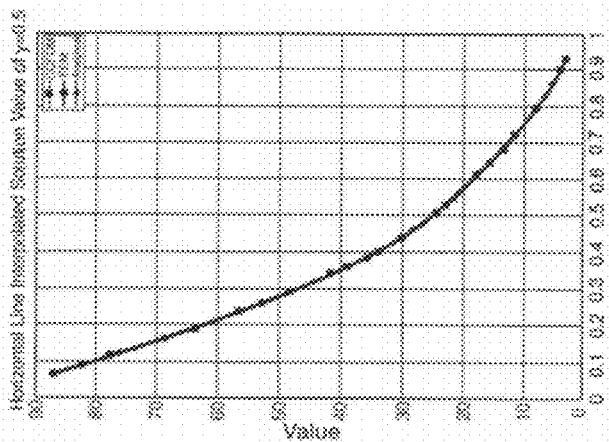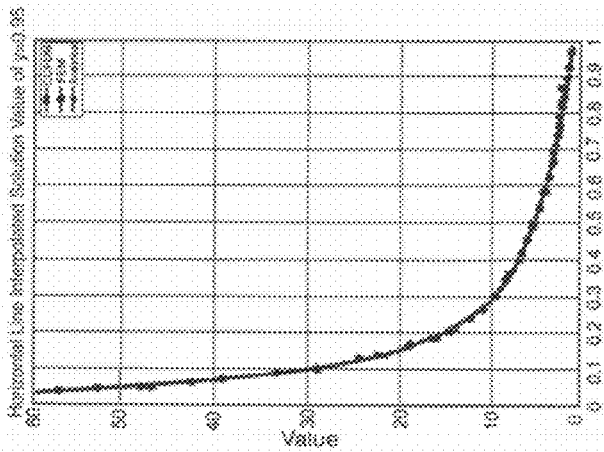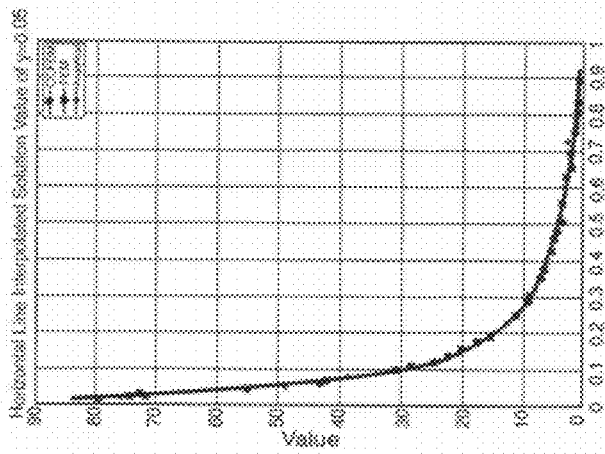

SYSTEM AND METHOD FOR DETERMINING FLUID FLOW OF COMPRESSIBLE AND NON-COMPRESSIBLE LIQUIDS

RELATED APPLICATIONS

This application claims the benefit under 35 USC §119(e) to U.S. Provisional Application No. 61/457,589, filed on Apr. 26, 2011, the contents of which are hereby incorporated by reference in their entirety.

FIELD OF THE INVENTION

This invention relates to a system and method for modelling internal and/or boundary conditions, as for example to model or determine fluid flows in, around and/or across objects or structures and, in particular, for both compressible and non-compressible liquids.

BACKGROUND OF THE INVENTION

Computer methods and algorithms can be used to analyze and solve complex systems involving various forms of fluid dynamics having inputted boundary conditions. For example, computer modelling may allow a user to simulate the flow of air and other gases over an object or model the flow of fluid through a pipe. Computational fluid dynamics (CFD) is often used with high-speed computers to simulate the interaction of one or more fluids over a surface of an object defined by certain boundary conditions. Typical methods involve large systems of equations and complex computer modelling and include traditional finite difference methodology, cell-centered finite volume methodology and vertex-centered finite volume methodology.

Traditional Finite Difference Methodology

Traditional Finite Difference Methodology (TFDM) requires a structured grid system, a rectangular domain and uniformed grid spacing. TFDM cannot be applied on a mesh system with triangular cells (elements). Rather, cells must be quadrilateral (2D) and cannot be polygonal (i.e., number of sides=4). In 3D, cells must be rectangular cubes.

TFDM typically requires the use of coordinate transformations (i.e., grid generation) for curvilinear domains, to map the physical domain to a suitable computational domain. In addition, there may be a need to use a multiblock scheme if the physical domain is too complicated. Partial differential equations (PDEs) must be transformed to the computational domain.

Traditional Finite Difference Methodology is typically difficult to deal with in complicated grid arrangements. Special treatment may be required near boundaries of the domain (e.g., in staggered grid systems or for higher-order schemes). Even with coordinate transformations, highly irregular domains may create serious difficulties for accuracy and convergence due to numerical discontinuities in the transformation metrics. Cell-Centered Finite Volume Methodology/Vertex-Centered Finite Volume Methodology Cell-Centered Finite Volume Methodology (CCFVM) and Vertex-Centered Finite Volume Methodology (VCFVM) achieve greater flexibility in grid arrangement. Cells can be polygonal (e.g., triangular) in 2 Dimensional space or polyhedral (e.g., tetrahedral, prismatic) in 3 Dimensional space. With CCFVM/VCFVM there is no need for coordinate transformations to a computational domain. Rather, all calculations can be done in physical space. As well, grid smoothness is not an issue. Cell-centered schemes evaluate the dependent variable at the centroid of each cell. Vertex-centered (or vertex-based) schemes evaluate the dependent variable at the vertices of each cell.

With CCFVM/VCFVM, inaccuracies due to calculation of fluxes across cell faces may be difficult to deal with. In addition, there are difficulties associated with treatment near boundaries for higher-order schemes, and accuracy and convergence issues associated with cells that are severely skewed or have a high aspect ratio.

Accordingly, current computer modelling schemes are limited in the form of objects they can model and require different models and algorithms for different fluid applications, such as between compressible and non-compressible fluids.

SUMMARY OF THE INVENTION

It is an object of this invention to provide a better method and system for determining and/or modelling boundary conditions, as for example, to determine or compute fluid dynamics of compressible and non-compressible liquids in, around or across objects. In one particular embodiment, it is an object of this invention to provide a better method and system to compute the fluid dynamics of compressible liquids in aeronautical application, the aeronautical applications having certain boundary conditions.

Furthermore, another object of this invention to provide a better method and system for computing the fluid dynamics of non-compressible liquids within a pipe or transport mechanism, the pipe or transport mechanism having certain boundary conditions.

The inventors have appreciated that if the solution domain can be discretized into a smooth structured grid, the FDM is better than the FVM (or the FEM) due to its efficiency. In particular, an FDM method requires less memory and has better stability. Furthermore, a system and method relying on an FDM has better convergence properties.

In one aspect, the present invention resides in a system for modelling internal and/or boundary conditions and more preferably, by determining fluid flow of compressible and non-compressible liquids, as for example, in, around or across an object or structure.

In one cell-centered finite different approach described hereafter lies in the discovery and development of a unified scheme for the numerical solution of Partial Differential Equations (PDEs), irrespective of their physical origin, which is solely based on the finite difference method, but is implemented in an innovative fashion that allows the use of an arbitrary mesh topology. Thus, the CCFDM enjoys the simplicity and strength of the traditional FDM, and the power and flexibility of the FVM and FEM.

The resulting program may evolve into entirely new multiphysics computational continuum mechanics software, or replace the core numerical processing component of some existing software packages with a much simpler and more efficient algorithm which permits a natural and seamless coupling of fluid and solid interaction, allows for a more precise analysis of accuracy and produces faster, more accurate and more reliable results.

The system may include input means for receiving a model of an object defined as a plurality of cells having a plurality of nodes P and a processor coupled to a memory. The processor may be configured for implementing the steps of discretizing a partial differential equation corresponding to the received model of the object; for each node P in the plurality of nodes P: (i) locating all neighbouring cells that share the node P, each of the neighbouring cells having a cell center; (ii)

approximating the partial differential equation at the cell center of each of the neighbouring cells using the discretized partial differential equation; and (iii) updating a solution of the partial differential equation at the node P by using the approximated discretized partial differential equation at all the neighbouring cell centers; and iteratively updating the solution for all the nodes P from an initial guess until a convergence criterion is satisfied.

In another aspect, the present invention resides in a computer-implemented method for approximating a partial differential equation for determining fluid flow of compressible and non-compressible liquids. The method comprising: discretizing the partial differential equation; receiving a model of the object defined as a plurality of cells having a plurality of nodes P; for each node P in the plurality of nodes P: (i) locating all neighbouring cells that share the node P, each of the neighbouring cells having a cell center; (ii) approximating the partial differential equation at the cell center of each of the neighbouring cells using the discretized partial differential equation; and (iii) updating a solution of the partial differential equation at the node P by using the approximated discretized partial differential equation at all the neighbouring cell centers; and iteratively updating the solution for all the nodes P from an initial guess until a convergence criterion is satisfied.

In yet another aspect, the present invention resides in a computer readable medium having instructions stored thereon that when executed by a computer implement a method for approximating a partial differential equation for determining fluid flow of compressible and non-compressible liquids. The method may include discretizing the partial differential equation; receiving a model of an object defined as a plurality of cells having a plurality of nodes P; for each node P in the plurality of nodes P: (i) locating all neighbouring cells that share the node P, each of the neighbouring cells having a cell center; (ii) approximating the partial differential equation at the cell center of each of the neighbouring cells using the discretized partial differential equation; and (iii) updating a solution of the partial differential equation at the node P by using the approximated discretized partial differential equation at all the neighbouring cell centers; and iteratively updating the solution for all the nodes P from an initial guess until a convergence criterion is satisfied.

Further and other features of the invention will be apparent to those skilled in the art from the following detailed description of the embodiments thereof.

BRIEF DESCRIPTION OF THE DRAWINGS

Reference may now be had to the following detailed description taken together with the accompanying drawings, in which:

FIG. 3A to 3C show examples of grid arrangements on which CCFDM, CCFVM and VCFVM can be applied, but TFDM cannot be applied;

FIGS. 9A to 9C show a comparison of CCFDM, FEM and the exact solution along horizontal lines y=0.05, 0.5 and 0.95, in accordance with an embodiment of the present invention;

DETAILED DESCRIPTION OF THE PREFERRED EMBODIMENTS

Figure 1:
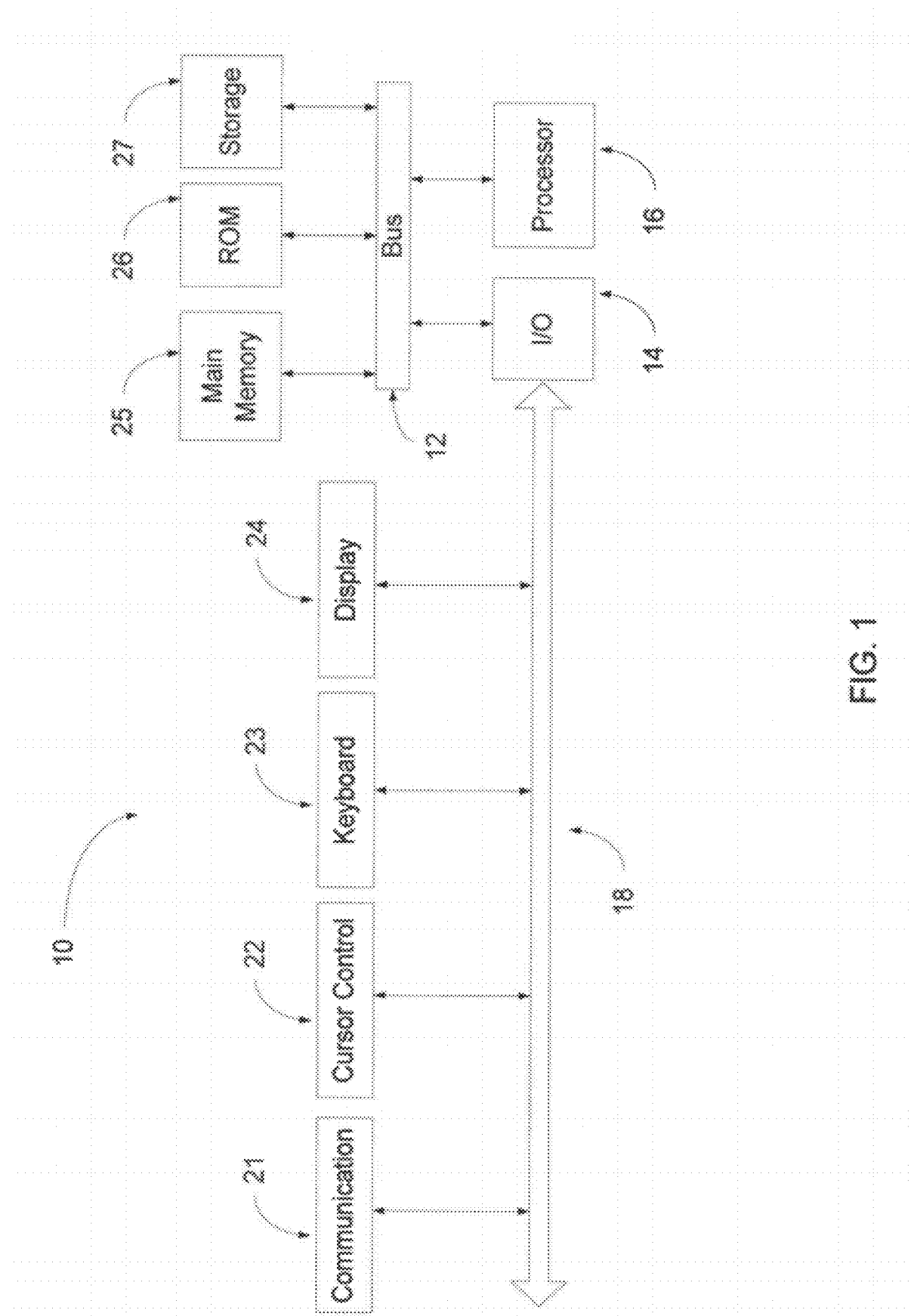
FIG. 1 shows schematically a computer system used in the modelling of flow dynamics in accordance with an embodiment of the present invention.

FIG. 1 illustrates schematically a computer system 10 on which a preferred embodiment of the present invention may be implemented. The computer system 10 includes a system bus 12 for communicating information, and a processor 16 coupled to the bus 12 for processing information.

The computer system 10 further comprises a random access memory (RAM) or other dynamic storage device 25 (referred to herein as main memory), coupled to the bus 12 for storing information and instructions to be executed by processor 16. Main memory 25 may also be used for storing temporary variables or other intermediate information during execution of instructions by the processor 16. The computer system 10 may also include a read only memory (ROM) and/or other static storage device 26 coupled to the bus 12 for storing static information and instructions used by the processor 16.

A data storage device 27 such as a magnetic disk or optical disc and its corresponding drive may also be coupled to the computer system 10 for storing information and instructions. The computer system 10 can also be coupled to a second I/O bus 18 via an I/O interface 14. A plurality of I/O devices may be coupled to the I/O bus 18, including a display device 24, an input device (e.g., an alphanumeric input device 23 and/or a cursor control device 22), and the like. A communication device 21 is used for accessing other computers (servers or clients) via an external data network (not shown). The communication device 21 may comprise a modem, a network interface card, or other well-known interface devices, such as those used for coupling to Ethernet, token ring, or other types of networks.

Embodiment #1

Compressible Fluids

In a preferred embodiment, computer system 10 is used to model the fluid dynamics of an aircraft landing gear through the air, such as during aircraft landing and in flight. In use of the system 10, a computer-aided designed (CAD) representation of the aircraft landing gear and supporting structure is inserted into the model.

Airflow, as a compressible fluid, may be constrained by initial conditions entered as part of the model or taken from sensors from real-world applications. The airflow may be modeled as a partial differential equation, as known in the art of fluid dynamics. For example, data from temperature and speed sensors may be included in the model, taken from real-world applications.

Once the boundary conditions and initial conditions have been inputted, the profile is input into the system 10 of the present invention and when the solution converges to a steady state, the solution is outputted. The solution may describe the flow of compressible fluid for the specific boundary conditions and initial conditions inputted into the model.

The system advantageously allows a user to determine and analyze the turbulence in the compressible fluid caused by the different aircraft components passing through the airflow. The steady state output can be used to identify and analyze different flow regimes, such as laminar flow and turbulent flow including eddies, vortices and other flow instabilities. In addition, the behaviour of the fluid about the boundary layer is also outputted. In particular, the noise of the flow over the aircraft component can be modeled including the frequency of any noise created.

It should be understood that the system 10 is capable of modeling any type of compressible fluid through a wide variety of applications, as further discussed below. Besides modelling the air passing over an aircraft component, other applications may include engine design, wind-tunnel effects and other airflow applications. In addition, the compressible fluid may be in a confined space, such as within a tunnel, or in a non-confined space, such as in flight.

Embodiment #2

Non-Compressible Fluids

The above-described computer system 10 can also be used to model the fluid dynamics of a non-compressible fluid through a defined space. For example, in a preferred embodiment, the computer system 10 can model a fluid such as water through a pipe or other transport mechanism.

As with the compressible embodiment, described above, a computer-aided designed (CAD) representation of the pipe is inserted into the simulation. Typical boundary conditions may be represented in the model.

The system 10 then models the flow of the non-compressible fluid, i.e. water or gas, through the pipe in successive stages. The non-compressible fluid may be further defined by its initial conditions or parameters. For example, the non-compressible fluid may include particulate matter and have a specific viscosity. The non-compressible fluid may be constrained by initial conditions entered as part of the computer simulation or taken from sensors from real-world applications. These parameters may be inserted into the partial differential equation (PDE) used to model the compressible fluid flow. For example, flow and temperature data from real-world flow-analysis may be inputted automatically into the simulation.

Once the solution of the system has converged to a steady state, the solution is outputted. The output data transformed into a usable format for describing the flow of the non-compressible fluid for the specific boundary conditions and initial conditions inputted into the simulation.

The solution to the simulation advantageously allows a user to determine and analyze the turbulence in the non-compressible fluid caused by the boundary conditions (i.e. the pipe). The steady state output can be used to identify and analyze different flow regimes, such as laminar flow and turbulent flow including eddies, vortices and other flow instabilities. In addition, the behaviour of the fluid about the boundary layer is also outputted. Furthermore, the simulation may model the aggregate (i.e. the particulate matter) in the fluid and the Reynolds Number (Re), as would be known to person skilled in the art.

It should be understood that the system 10 is capable of modeling any type of non-compressible fluid through a wide variety of applications. Besides simulating the flow of fluid passing through a pipe, other applications may include oil and gas applications and hydraulics.

Comparison of Cell-Centered Finite Difference Methodology and Prior Art Methods

A improved method of solving partial differential equations (PDEs) in accordance with the present invention is now described.

FIGS. 2A to 2E show grid comparisons of Traditional Finite Difference Methodology (TFDM), Cell-Centered Finite Difference Methodology (CCFDM) in accordance with the present invention, Cell-Centered Finite Volume Methodology (CCFVM) and Vertex-Centered Finite Volume Methodology (VCFVM) across selected illustrated grid arrangements are illustrated. As shown, the four different methodologies: TFDM, CCFDM, CCFVM and VCFVM can be used to solve the illustrated grid arrangement.

The TFDM requires that the PDE be applied at the node P. The TFDM is configured to use finite difference approximations for the derivatives in the PDE to "discretize" the equation.

Figure 2A:
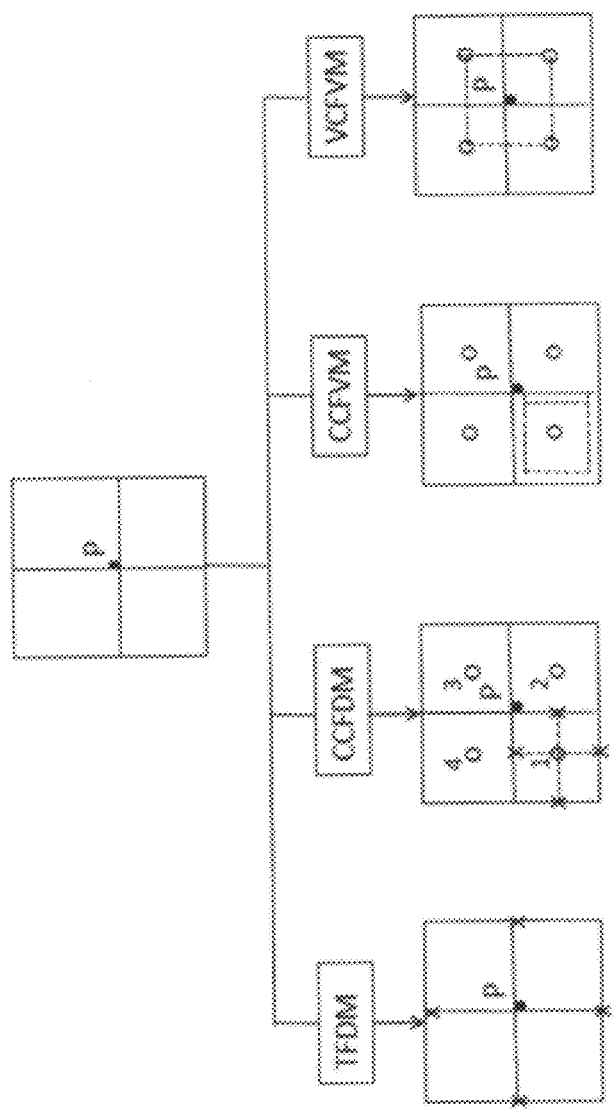
FIG. 2A shows a comparison of different modeling approaches of an embodiment of the present invention in comparison to prior art methods.

For the CFDM also shown in FIG. 2A, the PDE is applied at cell centers 1, 2, 3 and 4. The stencil is confined to each cell described. Furthermore, finite different approximations are used for the derivatives in the PDE to "discretize" the equation.

For the CCFVM also shown in FIG. 2A, the PDE is written in integral form and applied to each cell. The divergence theorem is used to write volume integrals as line integrals around the control volumes. In this manner, the line integrals can be approximated.

For the VCFVM also shown in FIG. 2A, the PDE is also written in integral form and applied to the control volume (CV) around P. The divergence theorem is used to write volume integrals as line integrals around the control volume. In this manner, the line integrals can be approximated.

Figure 2B:
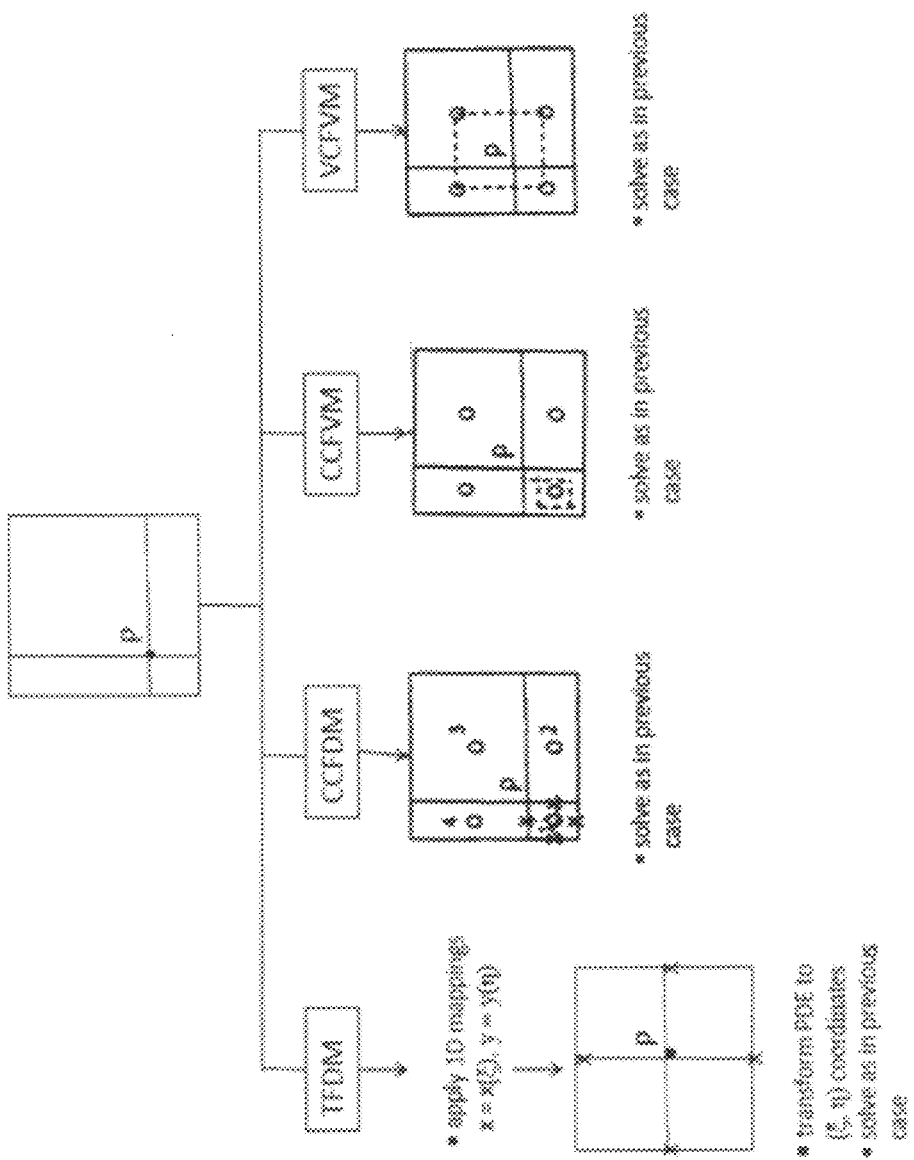
FIG. 2B shows a comparison of different modeling approaches of an embodiment of the present invention in comparison to prior art methods.

FIG. 2B shows additional grid arrangements where all four methodologies may be used. For the TFDM, the grid arrangement must first be mapped to a unit square, as shown. CCFDM, CCFVM and VCFVM may be applied to provide solutions, as described in the previous case shown in FIG. 2A.

Figure 2C:
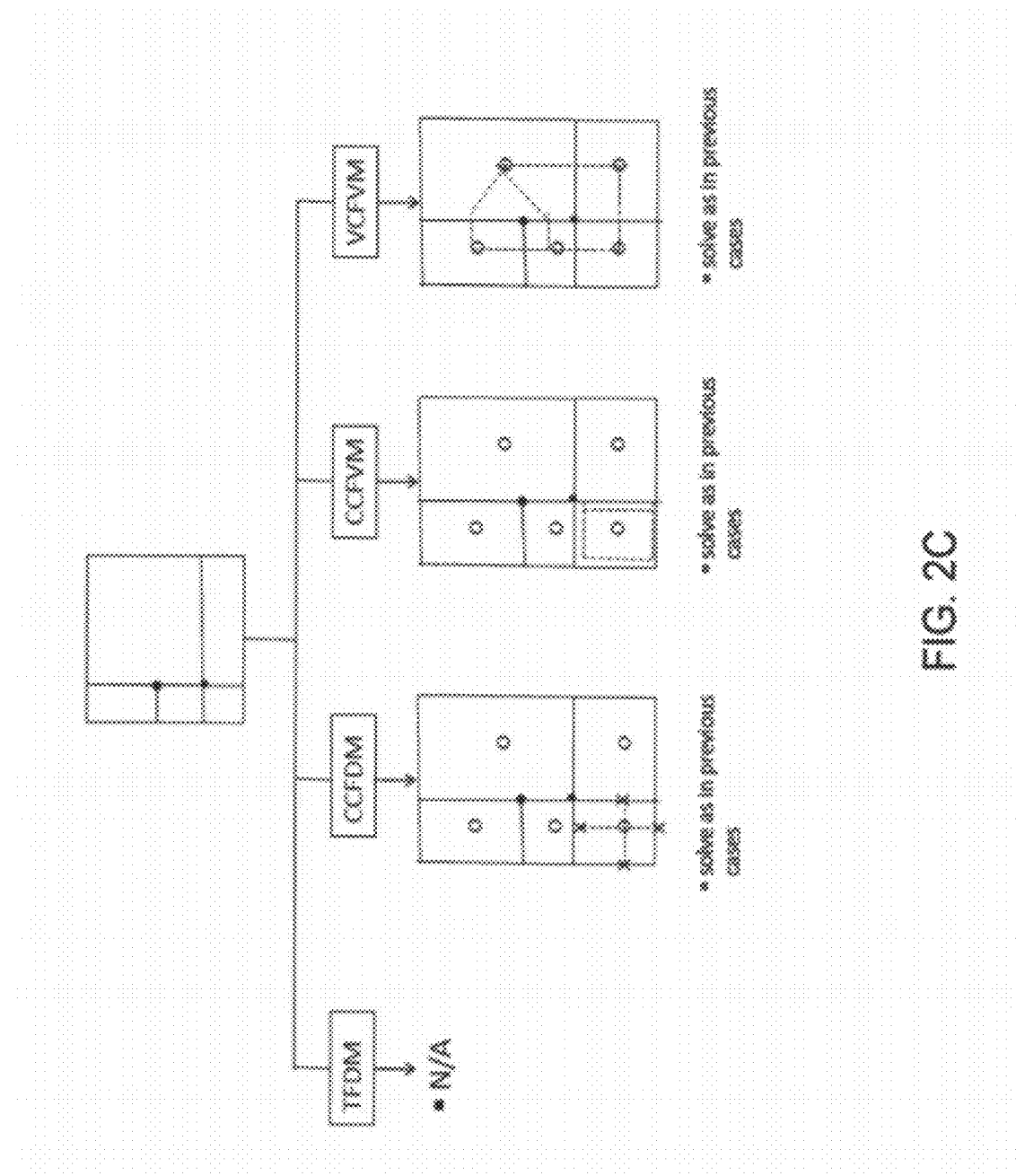
FIG. 2C shows a comparison of different modeling approaches of an embodiment of the present invention in comparison to prior art methods.

FIG. 2C illustrates a grid arrangement on which CCFDM, CCFVM and VCFVM can be applied, but TFDM cannot.

Figure 2D:
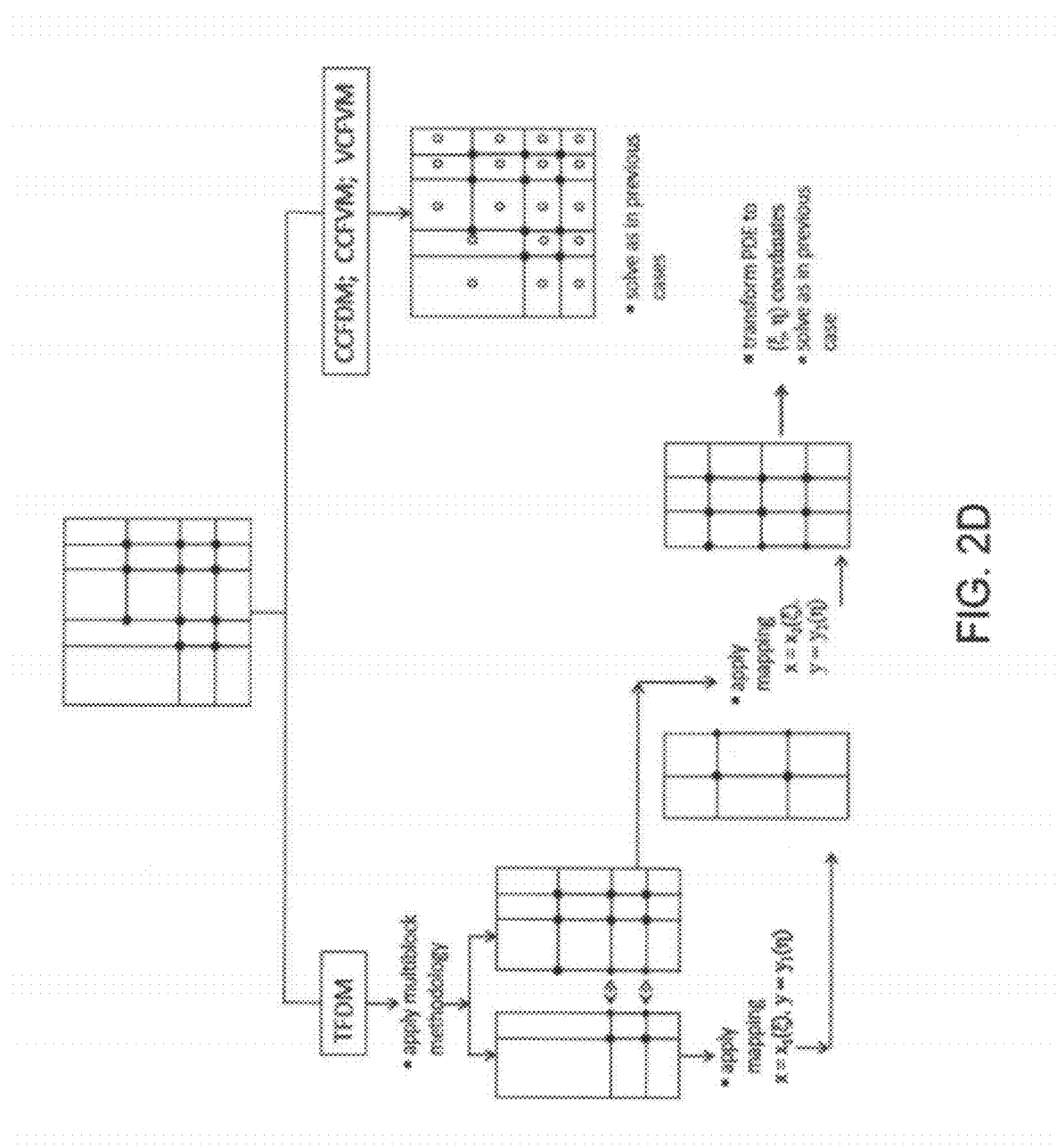
FIG. 2D shows a comparison of different modeling approaches of an embodiment of the present invention in comparison to prior art methods.

FIG. 2D illustrates a grid arrangement where the four different methodologies can be used to solve the illustrated grid arrangement. However, in order to use TFDM, the grid arrangement must first be transformed using multiblock methodology and transformations, as shown in the figure. CCFDM, CCFVM and VCFVM may be applied to provide solutions, as described in the previous case shown in FIG. 2A.

Figure 2E:
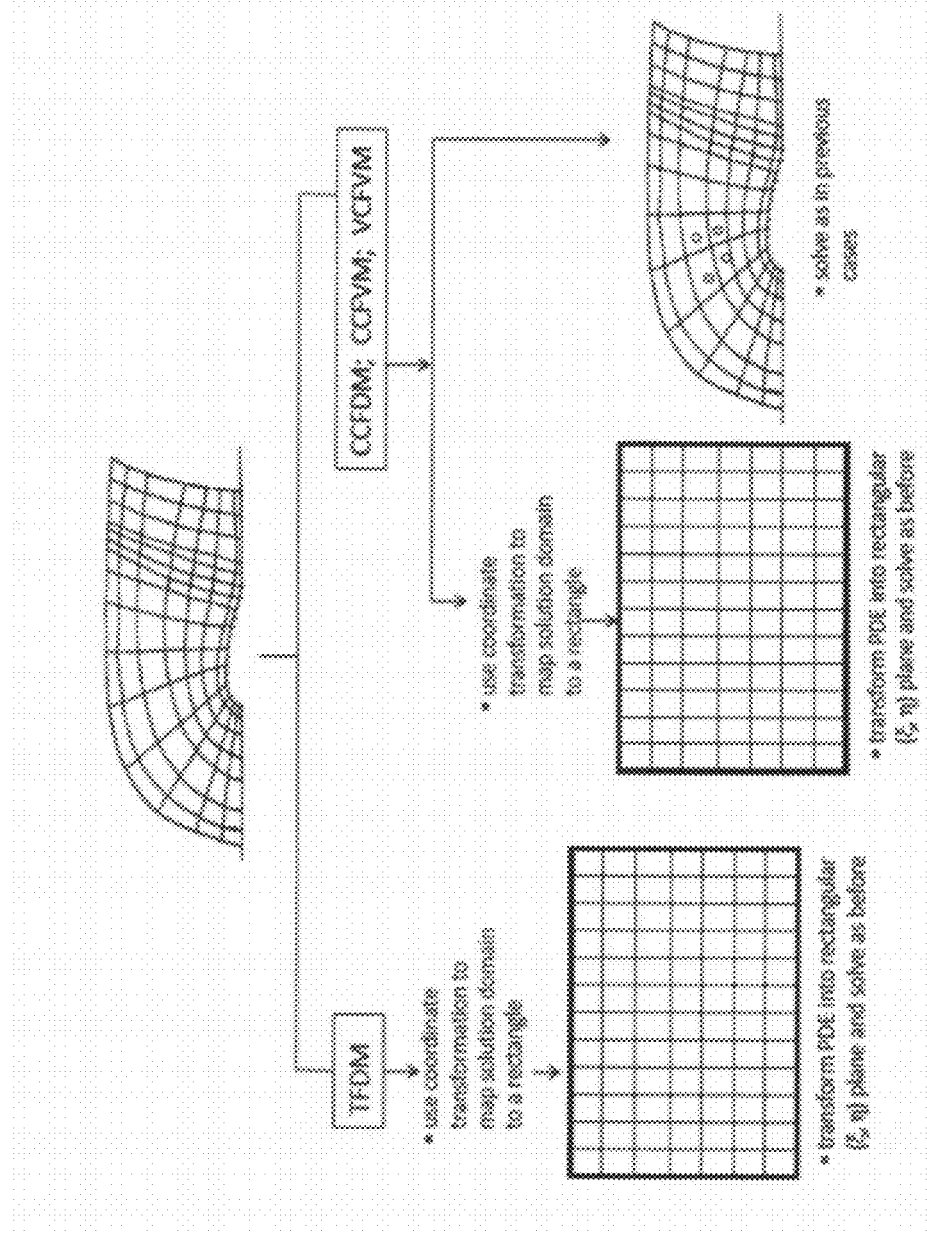
FIG. 2E shows a comparison of different modeling approaches of an embodiment of the present invention in comparison to prior art methods.

FIG. 2E illustrates curvilinear grid arrangement in which the four different methodologies can be used to solve a PDE. As shown, both TFDM and CCFDM first require coordinate transformations to map the solution domain to a rectangular plane. Once transformed, TFDM and CCFDM may be applied, as before. For CCFVM and VCFVM, no transformations are required.

FIGS. 3A to 3C illustrates additional examples of grid arrangements on which CCFDM, CCFVM and VCFVM can be applied, but TFDM cannot.

When referring to a perfect solution, a problem or grid configuration is selected which has an absolute mathematical solution. The applicant's method is applied to the same problem or grid and then the results of the two calculations are compared.

Cell-Centered Finite Difference Method

To implement the system of the present invention, an improved Cell-Centered Finite Difference Method (CCFDM) has been proposed.

Figure 4:
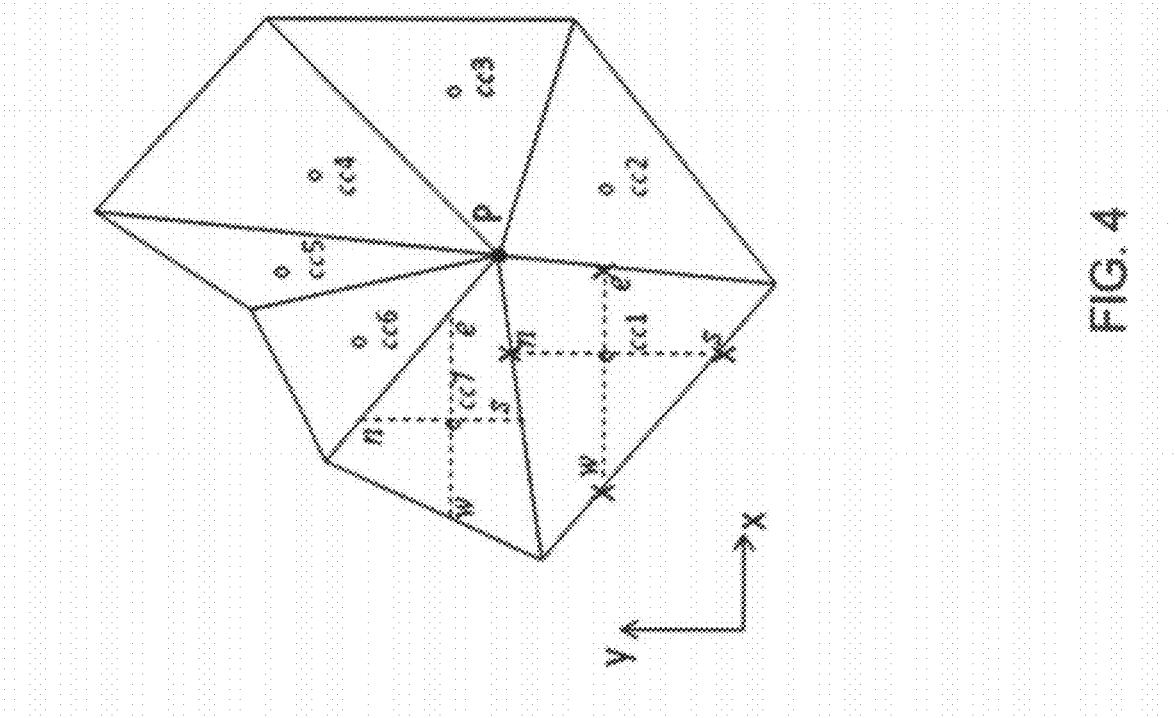
FIGS. 4 and 4A to 4D show schematically a generic node P and exemplary two dimensional models, in accordance with an embodiment of the present invention.

To illustrate the applicant's new numerical approximation process, in one example, a given Partial Differential Equation (PDE), or system of PDEs to be solved on a mesh arrangement containing elements (or cells), is shown in FIG. 4. Given the geometry of each cell, i.e., knowing the Cartesian coordinates of the cell vertices, the location of the cell centroids cc1, cc2, cc3, cc4, cc5, cc6, cc7 is determined. Then, a finite difference stencil is constructed for each cell. This stencil has the unique feature that it is confined to the cell, intersecting the boundary edges of each cell at points w, e, s and n.

Figure 5:
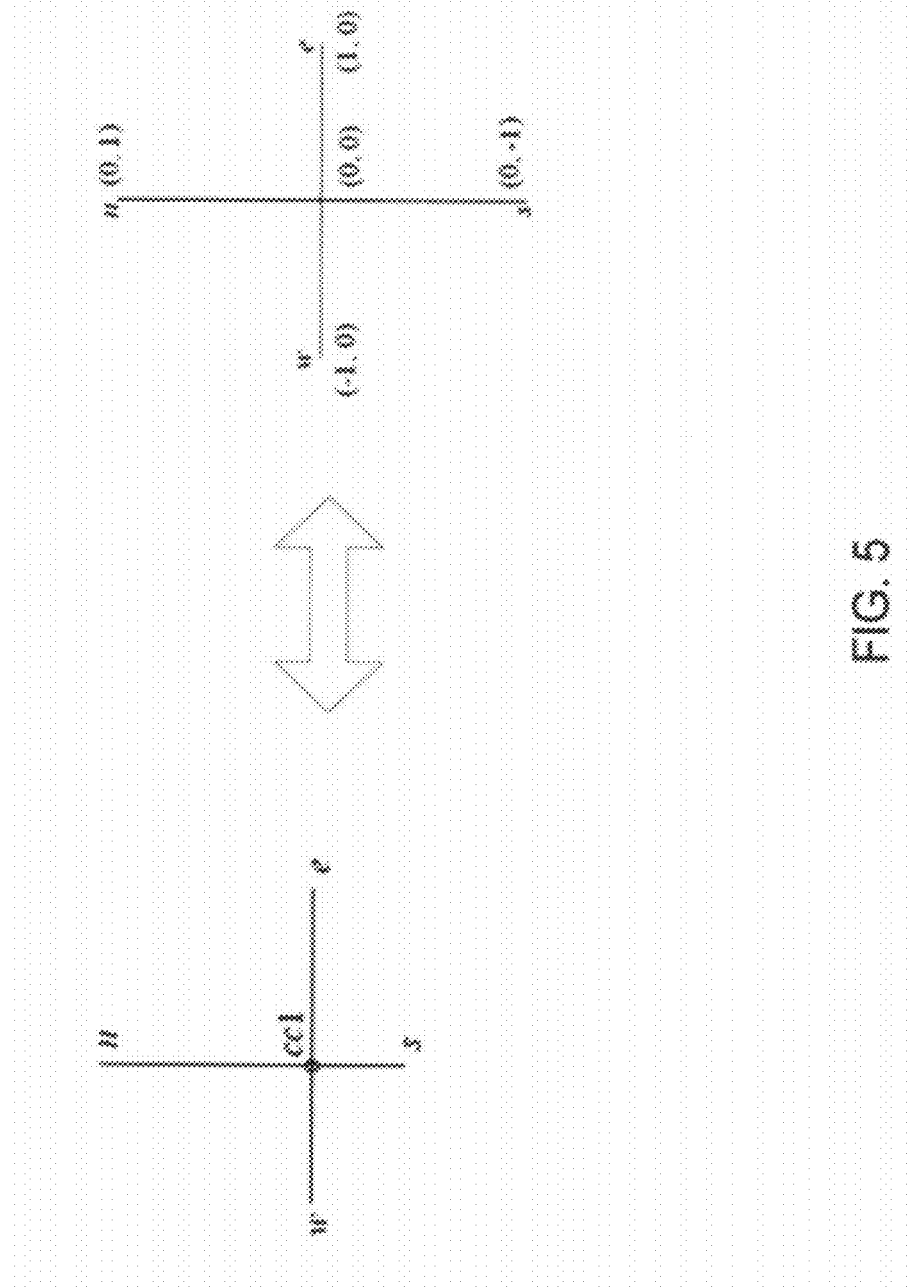
FIG. 5 shows a transformation of a cell center from a physical space (x, y) to a computational space ($\xi$, $\eta$) in accordance with an embodiment of the present invention.

For example, by examining the differencing stencil in cell #1, the distances from cc1 to e and w are shown as not equal. Similarly, the distances from cc1 to s and n are not equal. This inequality will degrade the accuracy of any central difference formula about the point cc1. To overcome this problem, 1D mappings are used from x to $\xi$ and from y to $\eta$ such that the line segment 'w-cc1-e' is mapped to a line segment $-1 \leq \xi \leq 1$ where cc1 is mapped to $\xi=0$. A similar mapping is used to map the line segment 's-cc1-n' to $-1 \leq \eta \leq 1$, as is shown in FIG. 5.

The PDE, which will be applied at the cell centroid cc1, must also be transformed to the computational space. Consider, for example, the model elliptic equation (Poisson eqn.):

$$\frac{\partial^2 T}{\partial x^2} + \frac{\partial^2 T}{\partial y^2} = f(x, y)$$

Under the 1D mappings $x=x(\xi)$, $y=y(\eta)$, this equation transforms to $$\frac{1}{x'^2}\frac{\partial^2 T}{\partial \xi^2} - \frac{x''}{x'^3}\frac{\partial T}{\partial \xi} + \frac{1}{y'^2}\frac{\partial^2 T}{\partial \eta^2} - \frac{y''}{y'^3}\frac{\partial T}{\partial \eta} = \bar{f}(\xi, \eta)$$

If one uses 3-point central differencing to approximate the partial derivatives in this equation, then the resulting difference equation can be written as:

$$a_{cc}T_{cc} = a_w T_w + a_e T_e + a_s T_s + a_n T_n - f_{cc};$$

where the coefficients are expressed in terms of the physical Cartesian coordinates of the w, e, s and n points. This equation can be solved iteratively for the value of T at the cell centroid, assuming we have previous iteration values for $T_w$, $T_e$, $T_s$ and $T_n$.

Figure 4A:
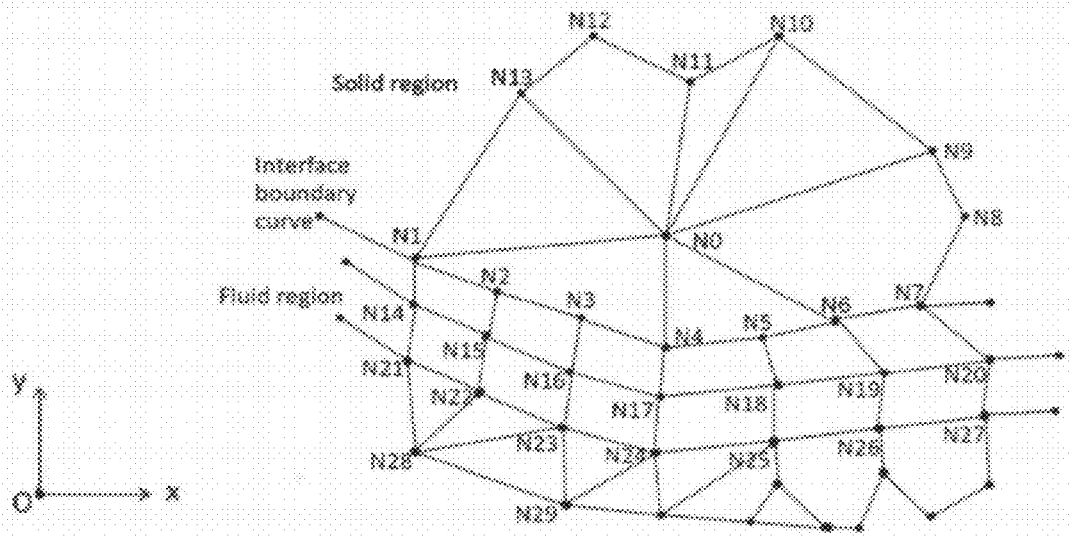

Step 1: Create a mesh for the region of interest. Label all nodes N0, N1, N2, etc. (FIG. 4A). Establish a fixed reference frame Oxy. Line segments N1-N2, N2-N3, - - -, N6-N7 form the interface boundary curve between the solid material (solid region) and the fluid material (fluid region) depicted in this model. The mesh in the model can be arbitrary or user influenced, e.g., the user can apply a finer mesh (smaller size cells) in the areas of the model where variables have high gradients. The finer mesh will result in higher resolution in those areas.

Figure 4B:
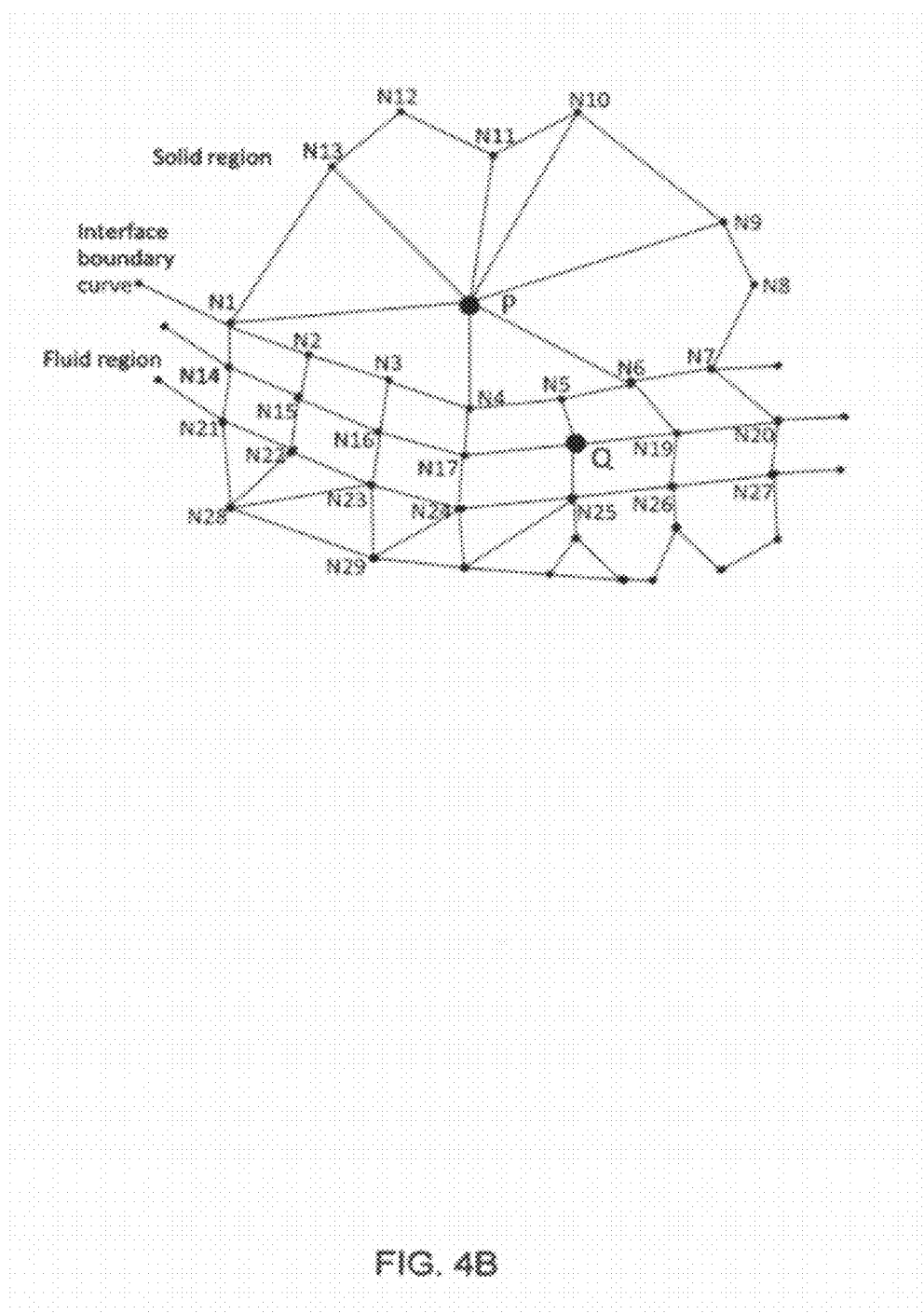

Step 2: Select any node in the mesh, and determine the cells sharing that node. For example, in the diagram below, P is a node in the solid region and Q is a node in the fluid region. The cells surrounding P are P-N1-N4, P-N4-N6, P-N6-N7-N8-N9, etc. (as shown in FIG. 4B). The cells surrounding Q are Q-N17-N24-N25, Q-N25-N26-N19, Q-N19-N6-N5 and Q-N5-N4-N17.

Figure 4C:
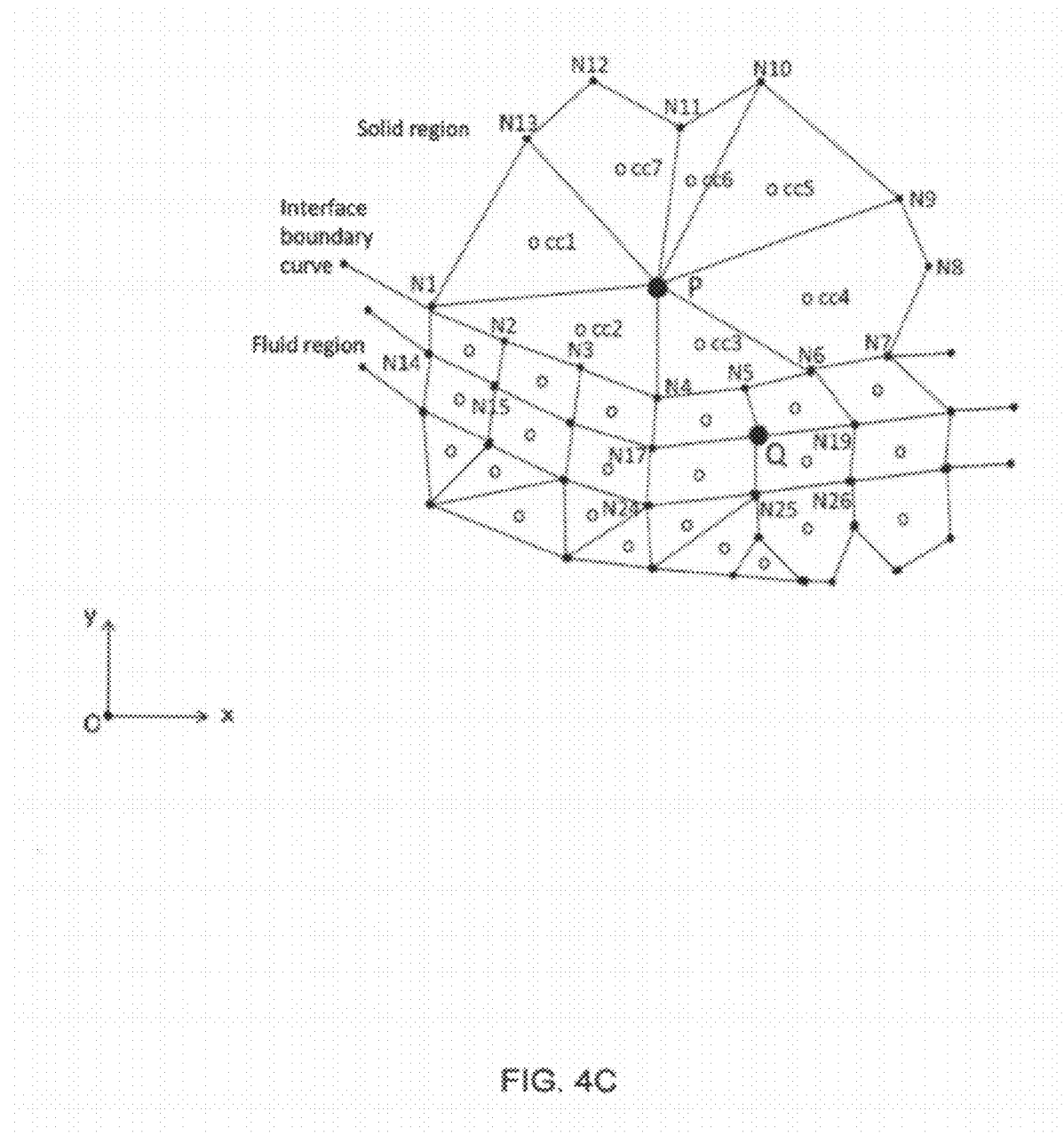

Step 3: For each cell surrounding P (or Q), determine the coordinates of the cell centroids cc1, cc2, etc. (FIG. 4C)

Figure 4D:
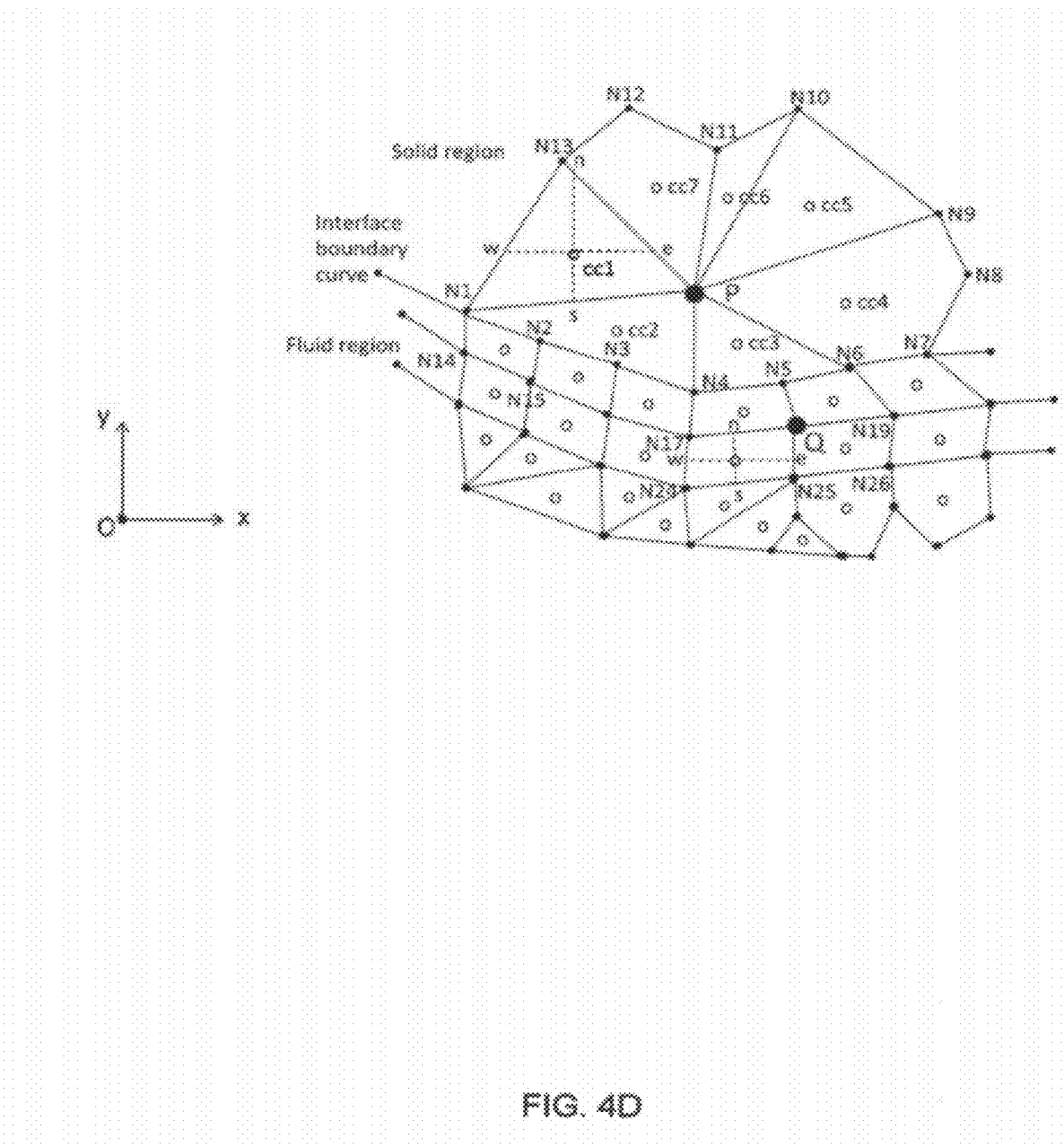

Step 4: Within each cell surrounding P (or Q), create a stencil centred at the cell centroid with arms parallel to the x, y, coordinate directions defined by the fixed reference frame, intersecting the cell faces at points w, e, s and n. For example, for node P refer to the cell formed by nodes P-N13-N1 with cell centre cc1. For node Q refer to the cell formed by nodes Q-N17-N24-N25. As an alternative to using cell centroids in Steps 3 and 4, it is possible to determine the coordinates of the point cc' in the cell which has the property that the length of the line segments w-cc' and cc'-e are equal and the length of the line segments s-cc' and cc'-n are equal (FIG. 4D).

Step 5: For each cell surrounding P (or Q), determine the coordinates of the face intersection points w, c, s and n.

Step 6: Repeat Steps 2-5 for all nodes in the mesh.

Step 7: Select a node P in the mesh at which the dependent variable (T) is to be evaluated, and collect all the cells surrounding P. This node P may be in the solid region, in the fluid region, or on the interface boundary curve.

Step 8: For each cell surrounding node P, apply the appropriate mathematical equation (e.g., PDE for solids, or PDE for fluids), defined by the medium in which the cell lies, at the cell centre. Approximate the continuous derivatives in the mathematical equations by standard finite difference formulae, applied on the stencils created in Step 4, to formulate a discrete approximation to the continuous equations. For each cell, this will result in a finite difference equation of the form $$a_{cc}T_{cc} + a_w T_w + a_e T_e + a_s T_s + a_n T_n = S_{cc} \quad (1)$$

if the cell is a solid cell, and of the same mathematical form $$a_{cc}T_{cc} + a_w T_w + a_e T_e + a_s T_s + a_n T_n = S_{cc} \quad (1)$$

if the cell is a fluid cell. In these equations the subscripts cc, w, etc., refer to the cell centre, face intersection point w, etc. The coefficients $a_{cc}$, $a_w$, $a_e$, $a_s$, $a_n$, and the source term $S_{cc}$ in equations (1) and (2) are not the same. These quantities depend on the nature of the continuous model equation (i.e., whether describing the solid motion or the fluid motion), the differencing scheme used, the cell topology and the coordinates of the face intersection points. Thus, in particular, the physical attributes of the medium, such as thermal conductivity, density, Young's modulus, Poisson's Ratio or modulus of elasticity for a solid cell, or such as kinematic viscosity, density, thermal conductivity or specific heat for a fluid cell, are embedded in these coefficients. From the computer's perspective, for each cell these coefficients are fixed constants and the solution process is identical, regardless of whether the cell is solid or fluid.

Step 9: The quantities $T_w$, $T_e$, $T_s$ and $T_n$ in equation (1) or (2) are approximated using an appropriate interpolation scheme based on neighbouring nodal and/or centroid values. These terms are taken to the right-hand side of the equation, and equation (1) or (2) is now approximated by $$a_{cc}T_{cc} = S_{cc} - a_w T_w^* - a_e T_e^* - a_s T_s^* - a_n T_n^* \quad (3)$$

where the superscript * refers to the approximate value obtained from the interpolation above.

Step 10: Equation (3) is solved for the quantity $T_{cc}$:

$$T_{cc} = \frac{S_{cc} - a_w T_w^* - a_e T_e^* - a_s T_s^* - a_n T_n^*}{a_{cc}} \quad (4)$$

Step 11: Repeat Steps 8-10 for each cell surrounding P, obtaining the value of T at all surrounding cell centres.

Step 12: Determine the value of T at node P by interpolation of the surrounding cell centre values.

Step 13: Select a new node P in the mesh and repeat Steps 8-12. Continue until all nodes in the mesh have been updated. This completes one sweep of the mesh.

The solution process described above] is iterative. Nodal values are repeatedly updated until some prescribed convergence criterion is satisfied.

Partial Differential Equations Solution Procedure

Figure 6A:
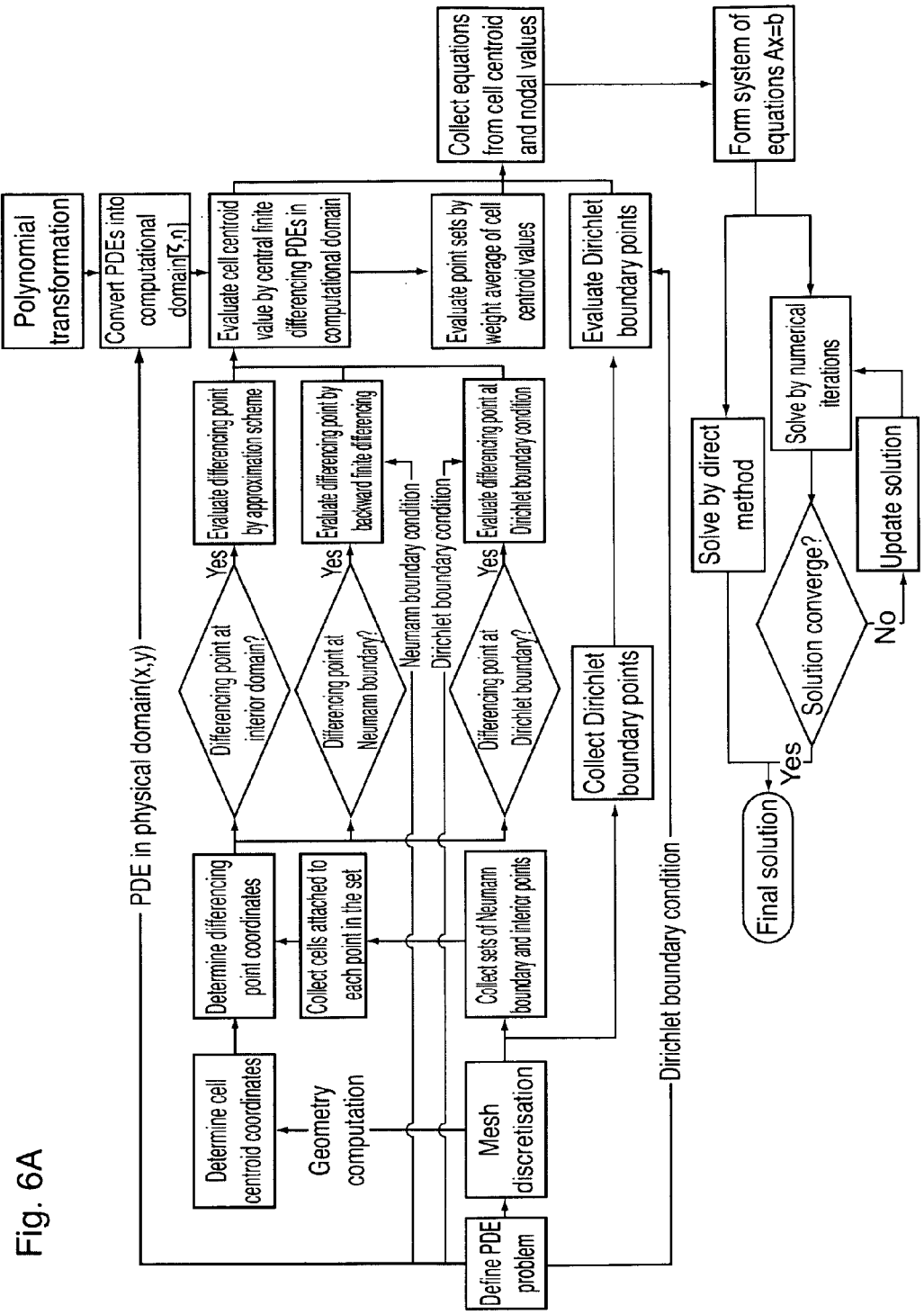
FIG. 6A shows a flowchart for calculating flow dynamics in a modeled system in accordance with an embodiment of the present invention.
Figure 6B:
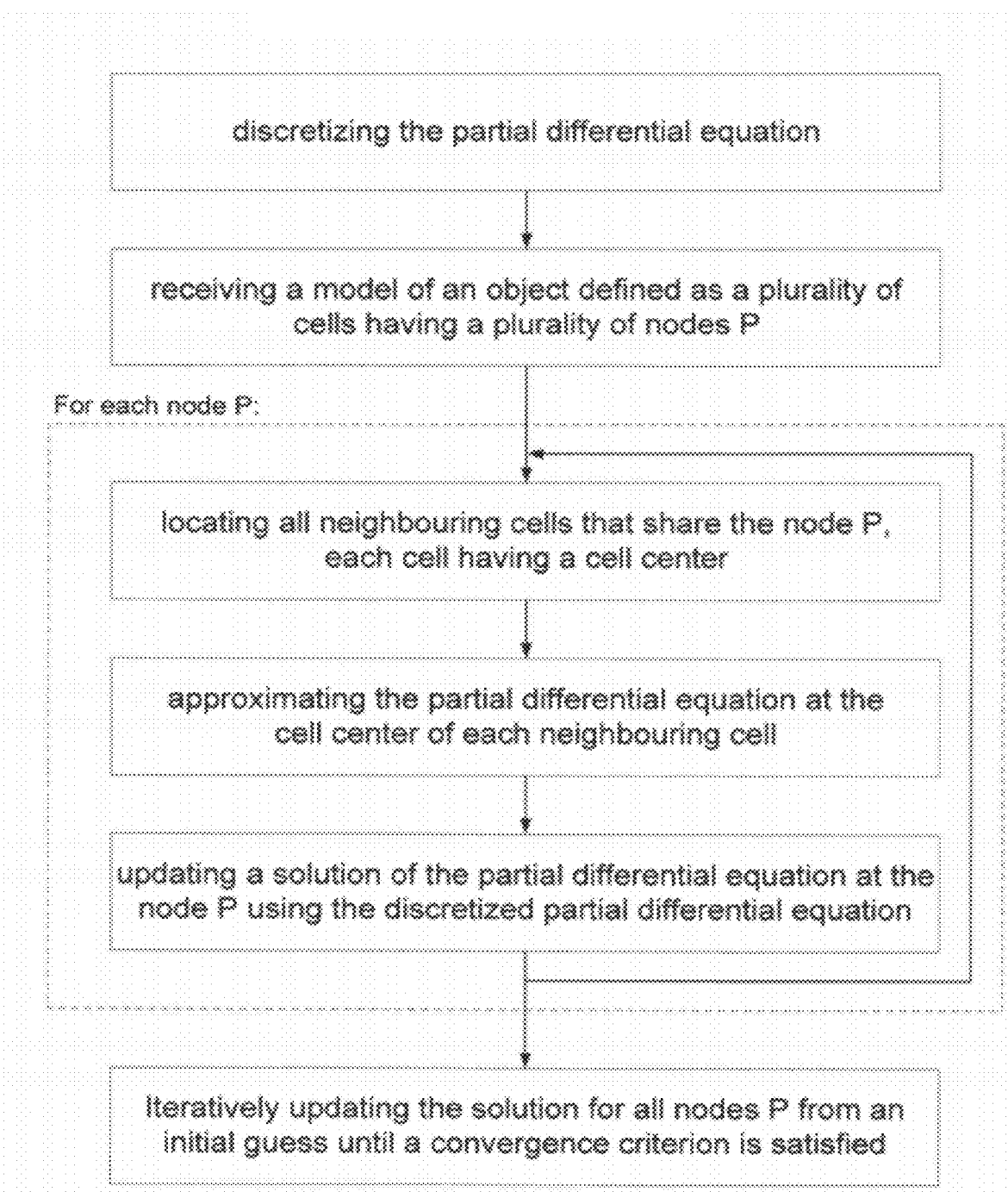
FIG. 6B shows a flowchart for calculating flow dynamics in a modeled system in accordance with another embodiment of the present invention.

The present system thus provides a preferred partial differential equations procedure shown in the process algorithm of FIGS. 6A and 6B. P is a typical node in the domain at which the dependent variable is to be evaluated. The PDE solution procedure is as follows:
a. find all the cells that share the current node (i.e. node P).
b. for each one of these cells;
i. calculate the cc coordinates, and the coordinates of w, s, e and n intersections.
ii. calculate $T_c$ by weighted averaging between the two cc's that share e (i.e. cc1 and cc2). Similarly, evaluate $T_n$, $T_w$ and $T_s$.
iii. evaluate $T_{cc}$ from the discretized CCFDM form of the model equation.
c. update node P by weighted averaging from all adjacent cell centres.

The calculations start with an initial guess at P, which is then updated iteratively until the convergence criterion is satisfied.

EXAMPLES

FIGS. 7A to 7D, 8A, 8B and 9A to 9C illustrate graphically first example test cases with uniform structured mesh, clustered structured mesh, unstructured triangulated mesh, and unstructured refined mesh, as well as comparisons between the CCFDM solution, FEM and exact solutions.

In FIGS. 7A to 7D, a sample test case using the Laplace equation on a unit square with Dirichlet boundary conditions is illustrated. The Laplace equation for the sample test is described according to the following equations:

$$\frac{\partial^2 T}{\partial x^2} + \frac{\partial^2 T}{\partial y^2} = 0; \forall (x, y) \in (0, 0) \times (1, 1)$$

$$T(x, 0) = T(x, 1) = T(1, y) = 0, T(0, y) = 1$$

Figure 7:
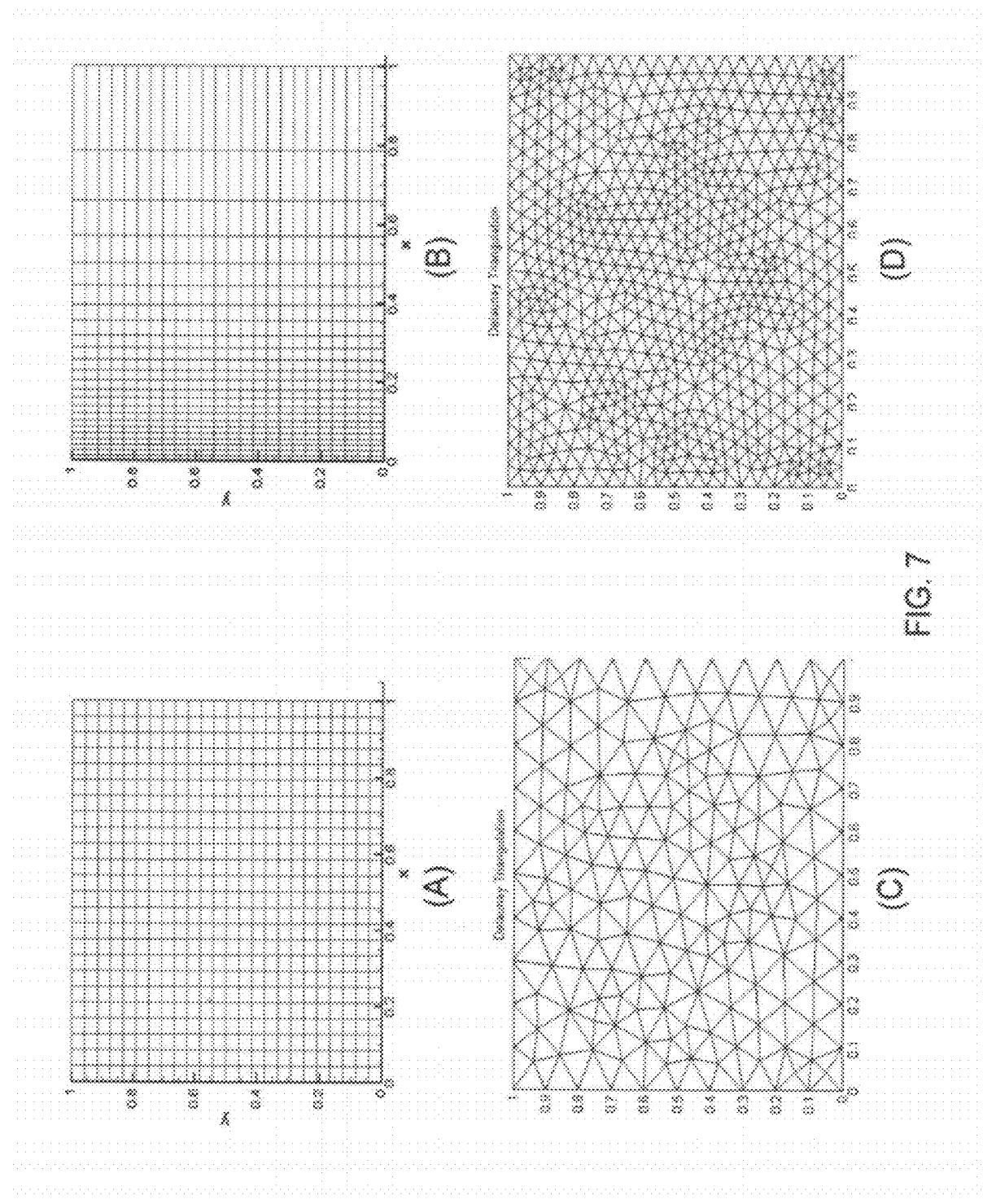
FIGS. 7A to 7D show different representational models for a unit square in accordance with an embodiment of the present invention.

Different meshes are shown for the unit square. In FIG. 7A, a uniform structured mesh is shown. In FIG. 7B, a clustered structured mesh is shown. In FIG. 7C, an unstructured (triangulated) mesh is shown. In FIG. 7D, an unstructured refined mesh is shown.

Figure 8:
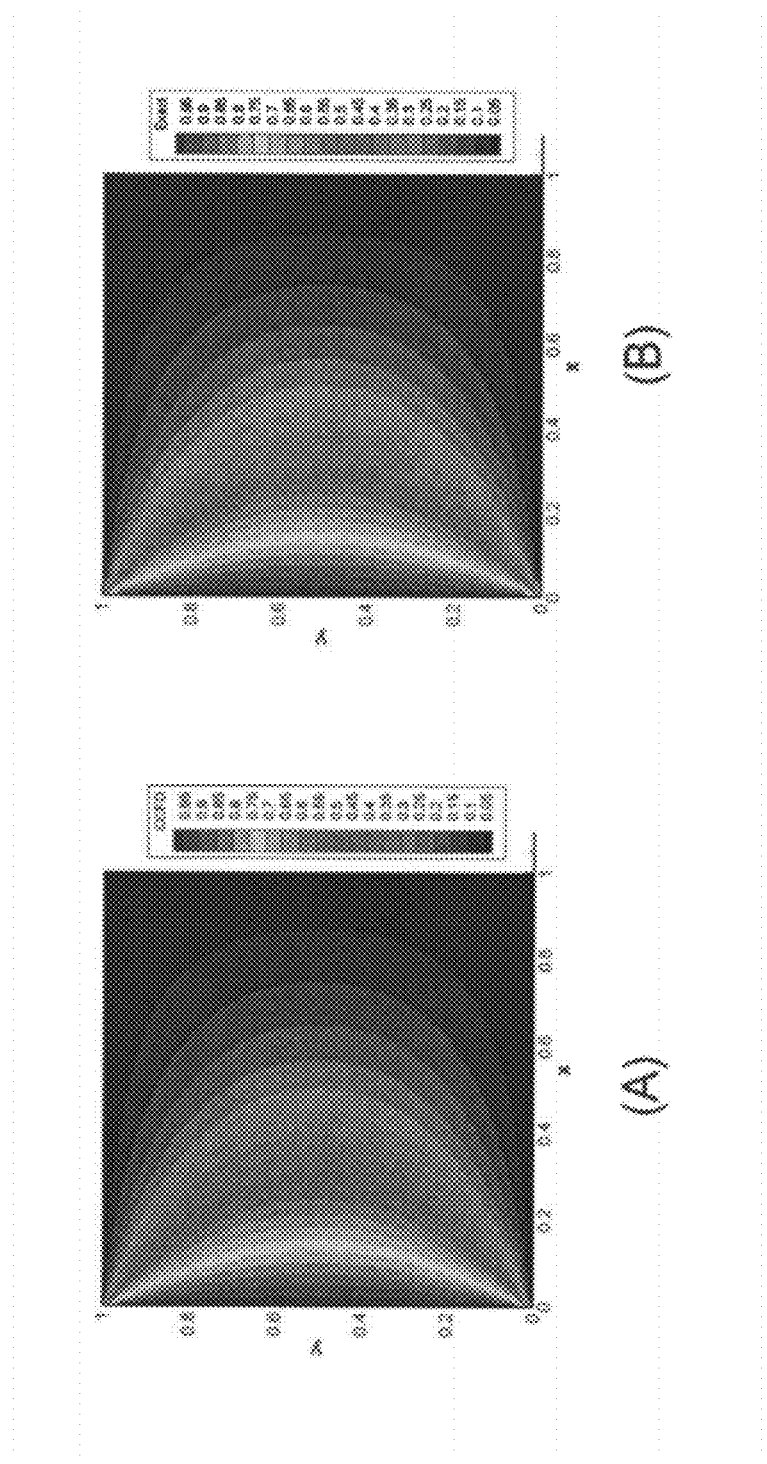
FIG. 8A and FIG. 8B show a comparison between a solution for the Laplace equation on a unit square with Dirichlet boundary conditions using an embodiment of the present invention with the exact solution.

FIG. 8A shows the CCFDM solution to the sample test case using the Laplace equation on a unit square, in accordance with an embodiment of the present invention. As compared to the exact solution shown in FIG. 8B, the approximated version using CCFDM shows a solution which closely matches the exact solution.

FIGS. 9A to 9C show a comparison of CCFDM, FEM and the exact solution along horizontal lines y=0.005, 0.5 and 0.95; respectively. As shown, both the CCFDM and FEM provide solutions which closely match the exact solution.

Figure 10:
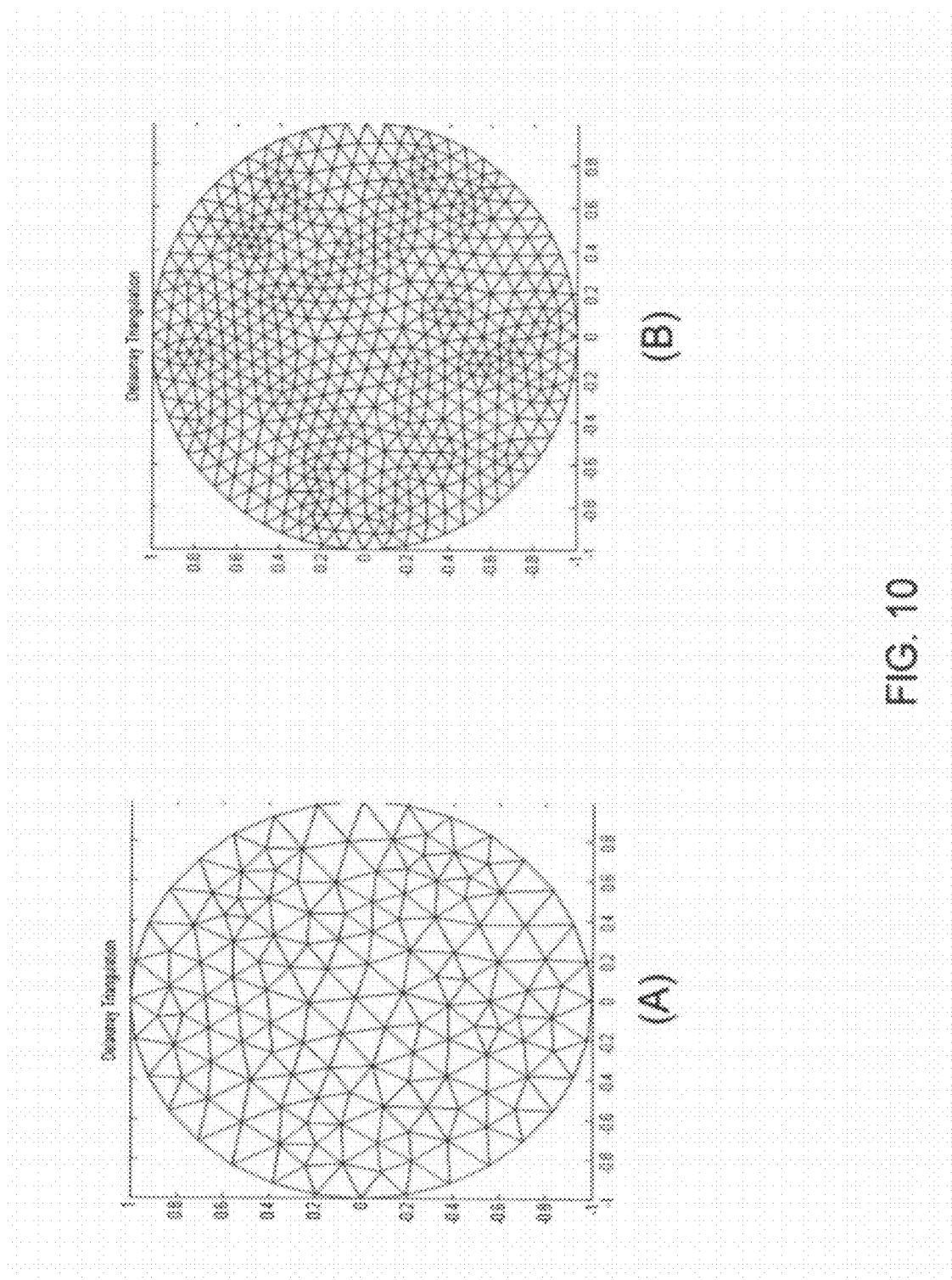
FIG. 10A and FIG. 10B show different representational models for a unit disk in accordance with an embodiment of the present invention

A second example was conducted with a coarse mesh and fine mesh for a Poisson equation on a unit disk with Dirichlet boundary conditions. The coarse mesh is shown in FIG. 10A and the fine mesh is shown in FIG. 10B. The second example is described according to the following equations:

$$\frac{\partial^2 T}{\partial x^2} + \frac{\partial^2 T}{\partial y^2} = -1; \forall (x, y) \in \Omega, T(x, y) = 0, \forall (x, y) \in \partial\Omega$$

When run, the results were compared to the exact solution. In particular, the relative error (RE) and root mean square error (RMSE) for the above example is shown in Table 1:

TABLE 1

| | Error compared to Exact Solution | |
|---|---|---|
| Mesh | RE | RMSE |
| Coarse | 3.43% | 6.115e−04 |
| Fine | 2.03 | 1.842e−04 |

Figure 11:
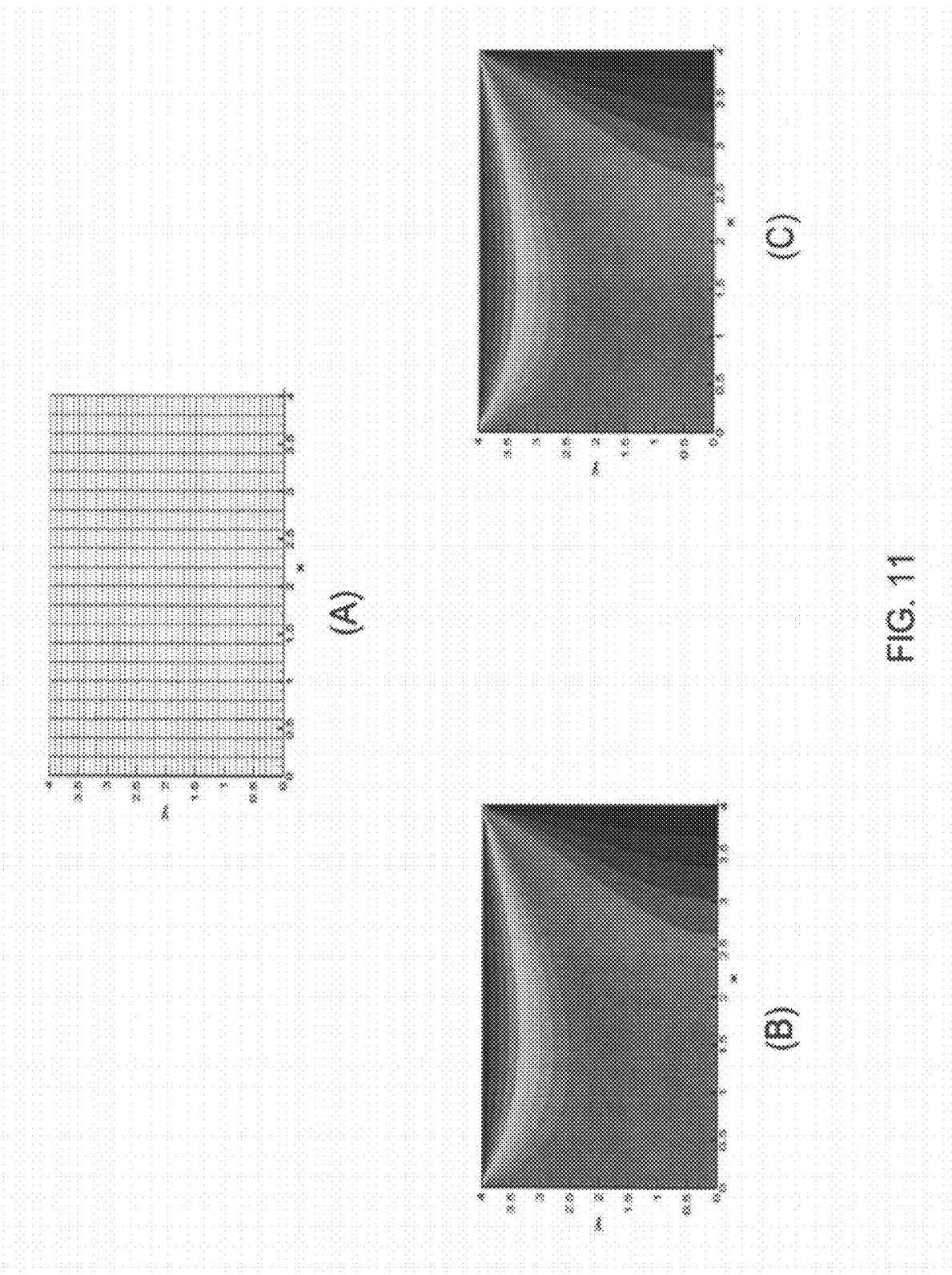
FIGS. 11A to 11C show a comparison of a Laplace equation on a square with Dirichlet and Neumann boundary conditions using an embodiment of the present invention with a TFDM solution.

FIGS. 11A to 11C illustrate third example results by the 21×41 grid shown in FIG. 11A with CCFDM solution shown in FIG. 11B and the TFDM solution shown in FIG. 11C.

The third example was conducted on a square with Dirichlet and Neumann boundary conditions according to the following equations:

$$\frac{\partial^2 T}{\partial x^2} + \frac{\partial^2 T}{\partial y^2} = 0; \forall (x, y) \in (0, 0) \times (4, 4)$$

$$T(0, y) = 80, T(4, y) = 0, T(x, 4) = 180, \frac{\partial T}{\partial y}(x, 0) = 0$$

As shown, CCFDM and TFDM provide similar numerical approximations.

Figure 12:
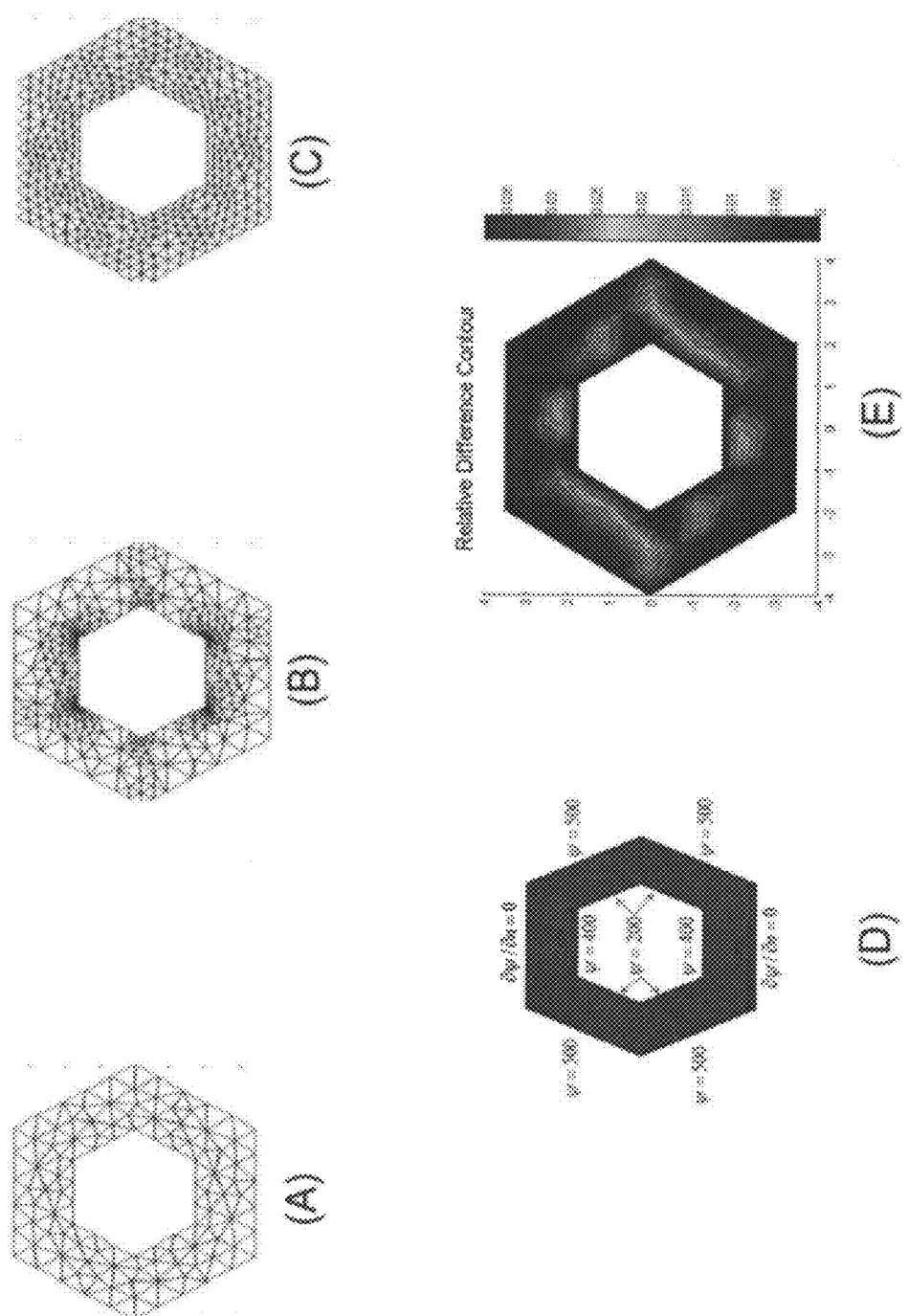
FIGS. 12A to 12E show a comparison of a Laplace equation on a hexagonal ring with Dirichlet and Neumann boundary conditions, in accordance with an embodiment of the present invention.

FIGS. 12A to 12E illustrate graphically fourth example results and relative difference contours on hexagonal ring between CCFDM solution and the FEM solution. In FIG. 12A, the hexagonal ring is illustrated.

In FIGS. 12B, 12C and 12D, a coarse mesh, a clustered mesh near the discontinuities, and a fine mesh are illustrated; respectively.

In FIG. 12E, the relative differences between the CCFDM solution and the FEM solution are illustrated. As shown, the relative differences between these methods are low. However, the inventors have appreciated that the numerical approximation provided by CCFDM provides a simpler and faster approach using discretized partial differential equations. The approach requires less memory and may be adaptable to a wider range of applications.

In particular, CCFDM may be used to solve both compressible fluids and non-compressible fluids in the same equation.

Extension of CCFDM Formulation to 3D

Figure 13:
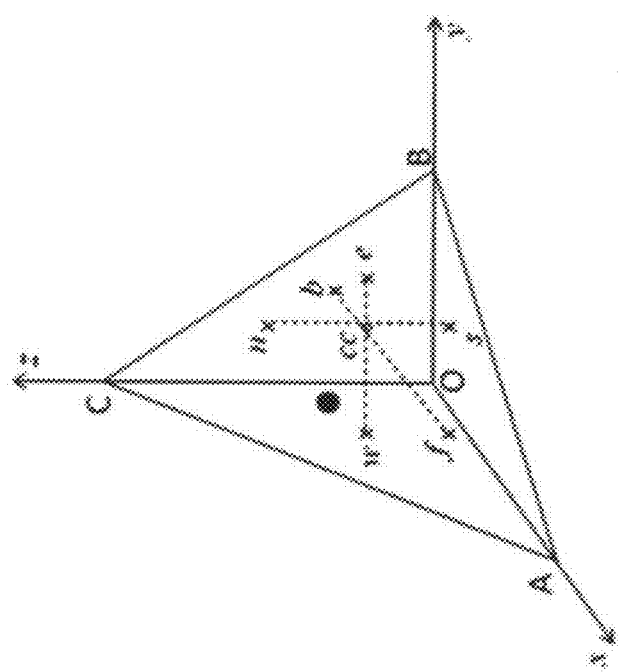
FIG. 13 shows a generic three dimensional cell for a three dimensional model, in accordance with an embodiment of the present invention.

The extension of the CCFDM to 3-dimensional problems is straightforward. Consider, for example, the tetrahedral cell shown in FIG. 13. Each face of this 4-faced volume element is triangular in shape. To simplify the discussion, the global Cartesian coordinate system is placed with its origin at one of the vertices of the tetrahedron OABC. Face OAB lies in the xy-plane, face OBC lies in the yz-plane and face OCA lies in the xz-plane.

For 3 Dimensional problems, the preferred procedure is as follows:
1. Given the coordinates of A, B and C, calculate the coordinates of the centroid cc of the cell.
2. Draw a line through cc parallel to the z-axis, extending it until it intersects two faces of the cell, at points n (on face ABC) and s (on face OAB) in the figure. Determine the coordinates of n and s.
3. Draw a line through cc parallel to the y-axis, extending it until it intersects two faces of the cell, at points w (on face OCA) and e (on face ABC) in the figure. Determine the coordinates of w and e.
4. Draw a line through cc parallel to the x-axis, extending it until it intersects two faces of the cell, at points f (on face ABC) and b (on face OBC) in the figure. Determine the coordinates of f and b.
5. Use three 1D mappings to map the non-uniform stencil in the physical domain to a computational stencil which has uniform spacing in each direction.
6. Apply the appropriate finite difference formulas at the cell centroid to discretize the governing PDEs.
7. Use interpolation formulae to evaluate the dependent variables at the points n, s, w, e, f and b.
8. Use the values obtained in #7 and the discretized equations in #6 to determine the values of the dependent variables at the cell centroid.

To determine the solution at a node in 3D space, all cells that share that node are first identified. The above procedure is applied to each of these cells to determine the values at the centroids of these cells. Then, a weighted average of the cell centroid values can be used to determine the nodal value.

Embodiments of the invention may include various steps as set forth above. While described in a particular order, it should be understood that a different order may be taken, as would be understood by a person skilled in the art. Furthermore, the steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

As well, the procedure described above can be implemented on any arbitrary cell topology, ie., any polyhedral shape, and any combination of cell shapes, referred to as hybrid meshes.

The CCFDM method described above is designed to be applicable to a number of physical problems that can be mathematically modeled by partial differential equations with associated initial conditions (for time-dependent problems) and/or boundary conditions. These include, but are not limited to providing output data and/or the manual or automated computer modelling and/or control of at least the following potential applications:

steady and unsteady fluid and gas flows
multi-component and multiphase fluid flows
solid mechanics, elasticity, stress analysis
heat conduction
fluid flow and heat transfer
scour simulations
sediment transport
electrostatics, electromagnetics
fluid-structure interaction
multiphysics simulations
cardiovascular flows
higher-order numerical schemes
direct numerical simulation of turbulence Although this disclosure has described and illustrated certain preferred embodiments of the invention, it is also to be understood that the invention is not restricted to these particular embodiments rather, the invention includes all embodiments which are functional, or mechanical equivalents of the specific embodiments and features that have been described and illustrated herein. Furthermore, the various features and embodiments of the invention may be combined or used in conjunction with other features and embodiments of the invention as described and illustrated herein. The scope of the claims should not be limited to the preferred embodiments set forth in the examples, but should be given the broadest interpretation consistent with the description as a whole.

As used herein, the aforementioned acronyms shall have the following meanings:
PDE—Partial Differential Equation
TFDM—Traditional Finite Difference Methodology
CCFDM—Cell-Centered Finite Difference Methodology
CCFVM—Cell-Centered Finite Volume Methodology
VCFVM—Vertex-Centered Finite Volume Methodology
CV—Control Volume
FEM—Finite Element Methodology The embodiments of the invention in which an exclusive property or privilege is claimed is defined as follows:

1. A system for determining fluid flow of compressible and non-compressible liquids, the system comprising:
   a processor coupled to a memory, the processor configured for implementing the steps of:
      receiving a model of an object defined as a plurality of cells having a plurality of nodes within a cartesian coordinate system for a region of interest;
      discretizing a partial differential equation corresponding to the received model of the object;

for each node P in the plurality of nodes:
  i. locating all neighbouring cells that share the node P, each of the neighbouring cells having a cell center; and
    for each said neighbouring cell,
      calculating cell center coordinate points for the cell center,
      establishing a finite difference stencil centered at the cell center coordinate points, said finite difference stencil comprising orthogonal axis parallel to coordinate system axis for the region of interest;
      identifying and designating points of intersection of the finite difference stencil with boundary edges of said cell as intersection points w, s, e and n,
      calculating an approximate solution of the partial differential equation at each of the w, s, e and n intersection points;
  ii. approximating the partial differential equation at the cell center of each of the neighbouring cells using the stencil in each cell and the discretized partial differential equation; and wherein the discretized partial differential equation includes the calculated approximate solution of the partial differential equation at each of the w, s, e and n intersections points;
  iii. updating a solution of the partial differential equation at the node P by using the solution of the approximated discretized partial differential equation at all the neighbouring cell centers; and
iteratively updating the solution for all the nodes P from an initial guess until a convergence criterion is satisfied,
identifying, analyzing and outputting different flow regimes relative to said object based on the iteratively updated solution; and
determining and displaying the behaviour of the fluid flow interacting with the received model of the object and its boundary by using the output different flow regimes.

2. The system of claim 1, wherein the step of calculating the solution of the partial differential equation at each of the w, s, e, and n intersection points by the processor includes a weighted averaging between the neighbouring cells that share each of said intersection points w, s, e, and n.

3. The system of claim 1, wherein the model of the object is in two dimensions.

4. The system of claim 1, wherein the model of the object is in three dimensions and the points of intersection further include intersection points f and b.

5. The system of claim 1, wherein the discretized partial differential equation is a difference equation.

6. The system of claim 1, wherein the updating of the solution of the partial differential equation at the node P by the processor includes weighted averaging of the solution of the approximated discretized partial differential equation at the cell centers of all the neighbouring cells.

7. A method of using a computer comprising a processor, memory and preprogrammed instructions to approximate a partial differential equation for determining fluid flow of compressible and non-compressible liquids, the method comprising:
  activating said computer to implement said preprogrammed instructions to perform the steps of:
    discretizing the partial differential equation by said processor;
    receiving a model of an object defined as a plurality of cells having a plurality of nodes within a cartesian coordinate system for region of interest in said memory by said processor;
    for each node P in the plurality of nodes:
      i. locating all neighbouring cells that share the node P, each of the neighbouring cells having a cell center; and
        for each said neighbouring cell,
          calculating cell center coordinate points for the cell center,
          establishing a finite difference stencil centered at the cell center coordinate points, said finite difference stencil comprising orthogonal axis parallel to coordinate system axis for the region of interest,
          identifying and designating points of intersection of the finite difference stencil with boundary edges of said cell as intersection points w, s, e and n,
          calculating an approximate solution of the partial differential equation at each of the w, s, e and n intersection points;
      ii. approximating the partial differential equation at the cell center of each of the neighbouring cells using the stencil in each cell and the discretized partial differential equation; and wherein the discretized partial differential equation includes the calculated approximate solution of the partial differential equation at each of the w, s, e and n intersections points;
      iii. updating a solution of the partial differential equation at the node P by using the solution of the approximated discretized partial differential equation at all the neighbouring cell centers; and
    iteratively updating the solution for all the nodes P from an initial guess until a convergence criterion is satisfied,
    identifying, analyzing and outputting different flow regimes relative to said object based on the iteratively updated solution; and
    determining and displaying the behaviour of the fluid flow interacting with the received model of the object and its boundary by using the output different flow regimes.

8. The method of claim 7, wherein the step of calculating the solution of the partial differential equation at each of the w, s, e, and n intersection points by the processor includes a weighted averaging between the neighbouring cells that share each of said intersection points w, s, e, and n.

9. The method of claim 7, wherein the model of the object is in two dimensions.

10. The method of claim 7, wherein the model of the object is in three dimensions and the points of intersection further include intersection points f and b.

11. The method of claim 7, wherein the discretized partial differential equation is a difference equation.

12. The method of claim 7, wherein the step of updating of the solution of the partial differential equation at the node P includes weighted averaging of the solution of the approximated discretized partial differential equation at the centers of all of said neighbouring cells.

13. A non-transitory computer readable medium having instructions stored thereon that when executed by a computer implement a method for approximating a partial differential equation for determining fluid flow of compressible and non-compressible liquids, the method comprising:

discretizing the partial differential equation;
receiving a model of an object defined as a plurality of cells having a plurality of nodes within a cartesian coordinate system for a region of interest;
for each node P in the plurality of nodes:
  i. locating all neighbouring cells that share the node P, each of the neighbouring cells having a cell center; and
     for each said neighbouring cell,
       calculating cell center coordinate points for the cell center,
       establishing a finite difference stencil centered at the cell center coordinate points, said finite difference stencil comprising orthogonal axis parallel to coordinate system axis for the region of interest,
       identifying and designating points of intersection of the finite difference stencil with boundary edges of said cell as intersection points w, s, e and n,
       calculating an approximate solution of the partial differential equation at each of the w, s, e and n intersection points;
  ii. approximating the partial differential equation at the cell center of each of the neighbouring cells using the stencil in each cell and the discretized partial differential equation; and wherein the discretized partial differential equation includes the calculated approximate solution of the partial differential equation at each of the w, s, e and n intersections points;
  iii. updating a solution of the partial differential equation at the node P by using the solution of the approximated discretized partial differential equation at all the neighbouring cell centers; and
iteratively updating the solution for all the nodes P from an initial guess until a convergence criterion is satisfied,
identifying, analyzing and outputting different flow regimes relative to said object based on the iteratively updated solution; and
determining and displaying the behaviour of the fluid flow interacting with the received model of the object and its boundary by using the output different flow regimes.

14. A computer readable medium of claim 13, wherein the step of calculating the solution of the partial differential equation at each of the w, s, e, and n intersection points includes a weighted averaging between the neighbouring cells that share each of said intersection points w, s, e, and n.

15. The computer readable medium of claim 13, wherein the model of the object is in three dimensions and the points of intersection further includes intersection points f and b.

16. A computer readable medium of claim 13, wherein the discretized partial differential equation is a difference equation.

17. A computer readable medium of claim 13, wherein the updating of the solution of the partial differential equation at the node P includes weighted averaging of the solution of the approximated discretized partial differential equation at the cell centers of all the neighbouring cells.

* * * * *